US012232098B2

(12) United States Patent
Raghavan et al.

(10) Patent No.: US 12,232,098 B2
(45) Date of Patent: Feb. 18, 2025

(54) PROACTIVE COMMUNICATION OF HYBRID BEAMFORMING PARAMETERS BETWEEN DEVICES

(71) Applicant: QUALCOMM Incorporated, San Diego, CA (US)

(72) Inventors: Vasanthan Raghavan, West Windsor Township, NJ (US); Junyi Li, Fairless Hills, PA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 17/666,062

(22) Filed: Feb. 7, 2022

(65) Prior Publication Data

US 2023/0254837 A1    Aug. 10, 2023

(51) Int. Cl.
*H04W 72/044* (2023.01)
*H04B 7/06* (2006.01)

(52) U.S. Cl.
CPC ........ *H04W 72/046* (2013.01); *H04B 7/0632* (2013.01); *H04B 7/0695* (2013.01)

(58) Field of Classification Search
None
See application file for complete search history.

(56) References Cited

U.S. PATENT DOCUMENTS 12,081,252 B1 *  9/2024  Xue .................... H04B 1/1027
2019/0068258 A1 *  2/2019  Oteri .................. H04L 25/0204
2019/0140730 A1 *  5/2019  Oteri .................... H04B 7/0695
2022/0167344 A1 *  5/2022  Horn .................... H04B 7/0617
2022/0385317 A1 * 12/2022  Jung ....................... H03F 1/30

(Continued)

FOREIGN PATENT DOCUMENTS

EP    3462620 A1 *  4/2019   ............. H03M 7/30
EP    3700100 B1 * 10/2023   ............. H04B 1/38

OTHER PUBLICATIONS

Tao et al. Constrained Deep Neural Network based Hybrid Beamforming for Millimeter Wave Massive MIMO Systems (Year: 2019).*

(Continued)

*Primary Examiner* — Christopher T Wyllie
(74) *Attorney, Agent, or Firm* — Holland & Hart LLP

(57) ABSTRACT

Methods, systems, and devices for wireless communication are described. In some systems, a first device may calculate hybrid beamforming parameters for a second device. The first device may calculate the hybrid beamforming parameters based on an estimation of channel information associated with at least a portion of a communication link at the second device via a machine learning model. Inputs to the machine learning model may include measured model parameters based on measurements performed by one or more other devices. The first device may transmit a message to the second device to indicate the hybrid beamforming parameters, which may include an input for a beam refinement process. The second device may perform the beam refinement process based on the hybrid beamforming parameters to identify one or more beams. The first and second devices may communicate using the one or more beams based on the beam refinement process.

30 Claims, 16 Drawing Sheets

(56) References Cited

U.S. PATENT DOCUMENTS

2023/0254837 A1* 8/2023 Raghavan ........... H04W 72/046
370/329

OTHER PUBLICATIONS

Chen et al. Hybrid Beamforming/Combining for Millimeter Wave MIMO: A Machine Learning Approach (Year: 2020).*
Aljumaily et al. Machine Learning Aided Hybrid Beamforming in Massive-MIMO Millimeter Wave Systems (Year: 2019).*
Elbir et a. Robust Hybrid Beamforming With Quantized Deep Neural Networks (Year: 2019).*
Chen et al. Robust Hybrid Beamforming With Quantized Deep Neural Networks (Year: 2020).*
EP_3462620 (Year: 2017).*
EP_3700100 (Year: 2018).*

* cited by examiner

PROACTIVE COMMUNICATION OF HYBRID BEAMFORMING PARAMETERS BETWEEN DEVICES

FIELD OF TECHNOLOGY

The following relates to wireless communication, including proactive communication of hybrid beamforming parameters between devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a first wireless device may transmit reference signals to a second wireless device. The devices may each represent an example of a base station, a UE, or some other network node such as an integrated access and backhaul (IAB) device, a customer premises equipment (CPE), a reflectarray, an intelligent reflecting surface (IRS) node, or the like. The second device may measure the reference signals and select a beam from a set of multiple potential beams to use for communications based on the measurements. For example, the second device may perform an optimization procedure over each of the potential beams. The second device may communicate with the first device using the selected beam.

SUMMARY

The described techniques relate to improved methods, systems, devices, and apparatuses that support proactive communication of hybrid beamforming parameters between devices. Generally, the described techniques provide for a first device to proactively or preemptively predict one or more system parameters for a second device. The system parameters may include, for example, beamforming parameters for the second device. In some examples, the first device, the second device, or both may support hybrid beamforming using fewer radio frequency (RF) chains than antenna elements at the respective devices. In such cases, the beamforming may be referred to as hybrid beamforming. The first device may utilize a learning model to calculate the beamforming parameters for communications with the second device. The first device may calculate the beamforming parameters based on an estimation of channel information associated with at least a portion of a communication link at the second device via the learning model. The first device may input, to the learning model, measured parameters based on measurements performed by the second device, by one or more other devices in the network, or both. The first device may transmit a message (e.g., a feedback message) to the second device to indicate the beamforming parameters.

The second device may utilize the indicated beamforming parameters as an input to a beam refinement process at the second device. For example, the beamforming parameters may correspond to a starting point or an initial search space for the beam refinement process. The second device may perform the beam refinement process based on the beamforming parameters to identify one or more beams. The second device may communicate with the first device using the one or more beams based on the beam refinement process. The first device may thereby assist the second device in performing the beam refinement process, which may improve communication reliability, reduce processing complexity, and reduce latency.

A method for wireless communication at a first device is described. The method may include calculating hybrid beamforming parameters for communications with a second device based on an estimation of channel information associated with at least a portion of a communication link at the second device via a machine learning model, where inputs to the machine learning model may include measured parameters based on measurements performed by the second device, by one or more other devices, or both, transmitting, to the second device, a message indicating the hybrid beamforming parameters, where the hybrid beamforming parameters may include an input for a beam refinement process at the second device, and communicating with the second device using one or more beams based on the hybrid beamforming parameters and a result of the beam refinement process.

An apparatus for wireless communication at a first device is described. The apparatus may include a processor, memory coupled with the processor, and instructions stored in the memory. The instructions may be executable by the processor to cause the apparatus to calculate hybrid beamforming parameters for communications with a second device based on an estimation of channel information associated with at least a portion of a communication link at the second device via a machine learning model, where inputs to the machine learning model may include measured parameters based on measurements performed by the second device, by one or more other devices, or both, transmit, to the second device, a message indicating the hybrid beamforming parameters, where the hybrid beamforming parameters may include an input for a beam refinement process at the second device, and communicate with the second device using one or more beams based on the hybrid beamforming parameters and a result of the beam refinement process.

Another apparatus for wireless communication at a first device is described. The apparatus may include means for calculating hybrid beamforming parameters for communications with a second device based on an estimation of channel information associated with at least a portion of a communication link at the second device via a machine learning model, where inputs to the machine learning model may include measured parameters based on measurements performed by the second device, by one or more other devices, or both, means for transmitting, to the second device, a message indicating the hybrid beamforming parameters, where the hybrid beamforming parameters may include an input for a beam refinement process at the second device, and means for communicating with the second device using one or more beams based on the hybrid beamforming parameters and a result of the beam refinement process.

A non-transitory computer-readable medium storing code for wireless communication at a first device is described. The code may include instructions executable by a processor to calculate hybrid beamforming parameters for communications with a second device based on an estimation of channel information associated with at least a portion of a communication link at the second device via a machine learning model, where inputs to the machine learning model may include measured parameters based on measurements performed by the second device, by one or more other devices, or both, transmit, to the second device, a message indicating the hybrid beamforming parameters, where the hybrid beamforming parameters may include an input for a beam refinement process at the second device, and communicate with the second device using one or more beams based on the hybrid beamforming parameters and a result of the beam refinement process.

In some examples of the method, apparatuses, and non-transitory computer-readable medium described herein, transmitting the message indicating the hybrid beamforming parameters may include operations, features, means, or instructions for transmitting the message indicating values used to generate the one or more beams in a beamforming codebook for use by the second device based on the estimation by the machine learning model, where the inputs to the machine learning model may include a first set of hybrid beamforming parameters.

In some examples of the method, apparatuses, and non-transitory computer-readable medium described herein, the values used to generate the one or more beams in the beamforming codebook include adjustments for scaling the beamforming codebook from a first carrier frequency to a second carrier frequency different than the first carrier frequency.

Some examples of the method, apparatuses, and non-transitory computer-readable medium described herein may further include operations, features, means, or instructions for establishing communications with a third device using the first set of hybrid beamforming parameters and utilizing the first set of hybrid beamforming parameters, position information associated with the third device, position information associated with the second device, or any combination thereof in the machine learning model based on establishing the communications with the third device.

In some examples of the method, apparatuses, and non-transitory computer-readable medium described herein, the position information associated with the third device and the position information associated with the second device indicate that the third device may be within a threshold distance of the second device.

In some examples of the method, apparatuses, and non-transitory computer-readable medium described herein, transmitting the message indicating the hybrid beamforming parameters may include operations, features, means, or instructions for transmitting the message indicating an estimated angular spread associated with a cluster capturing a channel matrix for the communication link between the first device and the second device based on the estimation by the machine learning model, where the inputs to the machine learning model may include a set of multiple signal strength measurements.

Some examples of the method, apparatuses, and non-transitory computer-readable medium described herein may further include operations, features, means, or instructions for transmitting a set of multiple reference signals to the second device, each reference signal of the set of multiple reference signals transmitted using a respective beam of a set of multiple beams, where the set of multiple beams may be steered toward spatially adjacent directions and receiving, from the second device, the set of multiple signal strength measurements, each signal strength measurement of the set of multiple signal strength measurements associated with a respective reference signal of the set of multiple reference signals.

In some examples of the method, apparatuses, and non-transitory computer-readable medium described herein, calculating the hybrid beamforming parameters may include operations, features, means, or instructions for calculating the estimated angular spread associated with the cluster capturing the channel matrix based on a quantity of one or more signal strength measurements of the set of multiple signal strength measurements that exceed a threshold signal strength.

In some examples of the method, apparatuses, and non-transitory computer-readable medium described herein, transmitting the message indicating the hybrid beamforming parameters may include operations, features, means, or instructions for transmitting the message indicating a set of one or more initial hybrid beamforming weights associated with the one or more beams based on the estimation by the machine learning model, where the inputs to the machine learning model may include a value indicative of a hand grip state associated with the second device.

Some examples of the method, apparatuses, and non-transitory computer-readable medium described herein may further include operations, features, means, or instructions for receiving, from the second device, an indication of the hand grip state associated with a state of a hand or fingers that hold the second device relative to one or more antenna elements of the second device, where calculating the hybrid beamforming parameters may be based on receiving the indication of the hand grip state.

In some examples of the method, apparatuses, and non-transitory computer-readable medium described herein, the indication of the hand grip state includes an index of the hand grip state from a set of multiple configured hand grip states.

In some examples of the method, apparatuses, and non-transitory computer-readable medium described herein, the hand grip state corresponds to one or more hand grip parameters, the one or more hand grip parameters including a reflective property of a hand, a grip arrangement of the hand, a quantity of fingers of the hand that occlude one or more antenna elements of the second device, an application executed by the second device, or any combination thereof.

In some examples of the method, apparatuses, and non-transitory computer-readable medium described herein, calculating the hybrid beamforming parameters may include operations, features, means, or instructions for calculating the hybrid beamforming parameters based on a machine learning algorithm, a prediction algorithm, or both associated with the machine learning model.

In some examples of the method, apparatuses, and non-transitory computer-readable medium described herein, each of the first device and the second device may be one of a base station, a user equipment (UE), an integrated access and backhaul (IAB) node, an intelligent reflecting surface (IRS) node, a relay node, a repeater, or a customer-premises equipment (CPE).

A method for wireless communication at a second device is described. The method may include receiving, from a first device, a message indicating hybrid beamforming parameters for communications with the second device, where the hybrid beamforming parameters may include an input for a beam refinement process at the second device, performing the beam refinement process based on the hybrid beamforming parameters, where a result of the beam refinement process may indicate one or more beams from a set of multiple beams for the second device, and communicating with the first device using the one or more beams based on the beam refinement process.

An apparatus for wireless communication at a second device is described. The apparatus may include a processor, memory coupled with the processor, and instructions stored in the memory. The instructions may be executable by the processor to cause the apparatus to receive, from a first device, a message indicating hybrid beamforming parameters for communications with the second device, where the hybrid beamforming parameters may include an input for a beam refinement process at the second device, perform the beam refinement process based on the hybrid beamforming parameters, where a result of the beam refinement process may indicate one or more beams from a set of multiple beams for the second device, and communicate with the first device using the one or more beams based on the beam refinement process.

Another apparatus for wireless communication at a second device is described. The apparatus may include means for receiving, from a first device, a message indicating hybrid beamforming parameters for communications with the second device, where the hybrid beamforming parameters may include an input for a beam refinement process at the second device, means for performing the beam refinement process based on the hybrid beamforming parameters, where a result of the beam refinement process may indicate one or more beams from a set of multiple beams for the second device, and means for communicating with the first device using the one or more beams based on the beam refinement process.

A non-transitory computer-readable medium storing code for wireless communication at a second device is described. The code may include instructions executable by a processor to receive, from a first device, a message indicating hybrid beamforming parameters for communications with the second device, where the hybrid beamforming parameters may include an input for a beam refinement process at the second device, perform the beam refinement process based on the hybrid beamforming parameters, where a result of the beam refinement process may indicate one or more beams from a set of multiple beams for the second device, and communicate with the first device using the one or more beams based on the beam refinement process.

In some examples of the method, apparatuses, and non-transitory computer-readable medium described herein, receiving the message indicating the hybrid beamforming parameters may include operations, features, means, or instructions for receiving the message indicating values used to generate the one or more beams in a beamforming codebook for use by the second device.

In some examples of the method, apparatuses, and non-transitory computer-readable medium described herein, the values used to generate the one or more beams in the beamforming codebook include adjustments for scaling the beamforming codebook from a first carrier frequency to a second carrier frequency different than the first carrier frequency.

In some examples of the method, apparatuses, and non-transitory computer-readable medium described herein, receiving the message indicating the hybrid beamforming parameters may include operations, features, means, or instructions for receiving the message indicating an estimated angular spread associated with a cluster capturing a channel matrix for a communication link between the first device and the second device.

Some examples of the method, apparatuses, and non-transitory computer-readable medium described herein may further include operations, features, means, or instructions for receiving a set of multiple reference signals from the first device, each reference signal of the set of multiple reference signals received using a respective beam of a set of multiple beams, where the set of multiple beams may be steered toward spatially adjacent directions and transmitting, to the first device, a set of multiple signal strength measurements, each signal strength measurement of the set of multiple signal strength measurements associated with a respective reference signal of the set of multiple reference signals, where the estimated angular spread may be based on the set of multiple signal strength measurements.

In some examples of the method, apparatuses, and non-transitory computer-readable medium described herein, receiving the message indicating the hybrid beamforming parameters may include operations, features, means, or instructions for receiving the message indicating a set of one or more initial hybrid beamforming weights associated with the one or more beams.

Some examples of the method, apparatuses, and non-transitory computer-readable medium described herein may further include operations, features, means, or instructions for transmitting, to the first device, an indication of a hand grip state associated with a state of a hand or fingers that hold the second device relative to one or more antenna elements of the second device, where the set of one or more initial hybrid beamforming weights may be based on the indication of the hand grip state.

In some examples of the method, apparatuses, and non-transitory computer-readable medium described herein, the indication of the hand grip state includes an index of the hand grip state from a set of multiple configured hand grip states.

In some examples of the method, apparatuses, and non-transitory computer-readable medium described herein, the hand grip state corresponds to one or more hand grip parameters, the one or more hand grip parameters including a reflective property of a hand, a grip arrangement of the hand, a quantity of fingers of the hand that occlude one or more antenna elements of the second device, an application executed by the second device, or any combination thereof.

In some examples of the method, apparatuses, and non-transitory computer-readable medium described herein, each of the first device and the second device may be one of a base station, a UE, an IAB node, an IRS node, a relay node, a repeater, or a CPE.

DETAILED DESCRIPTION

Figure 1:
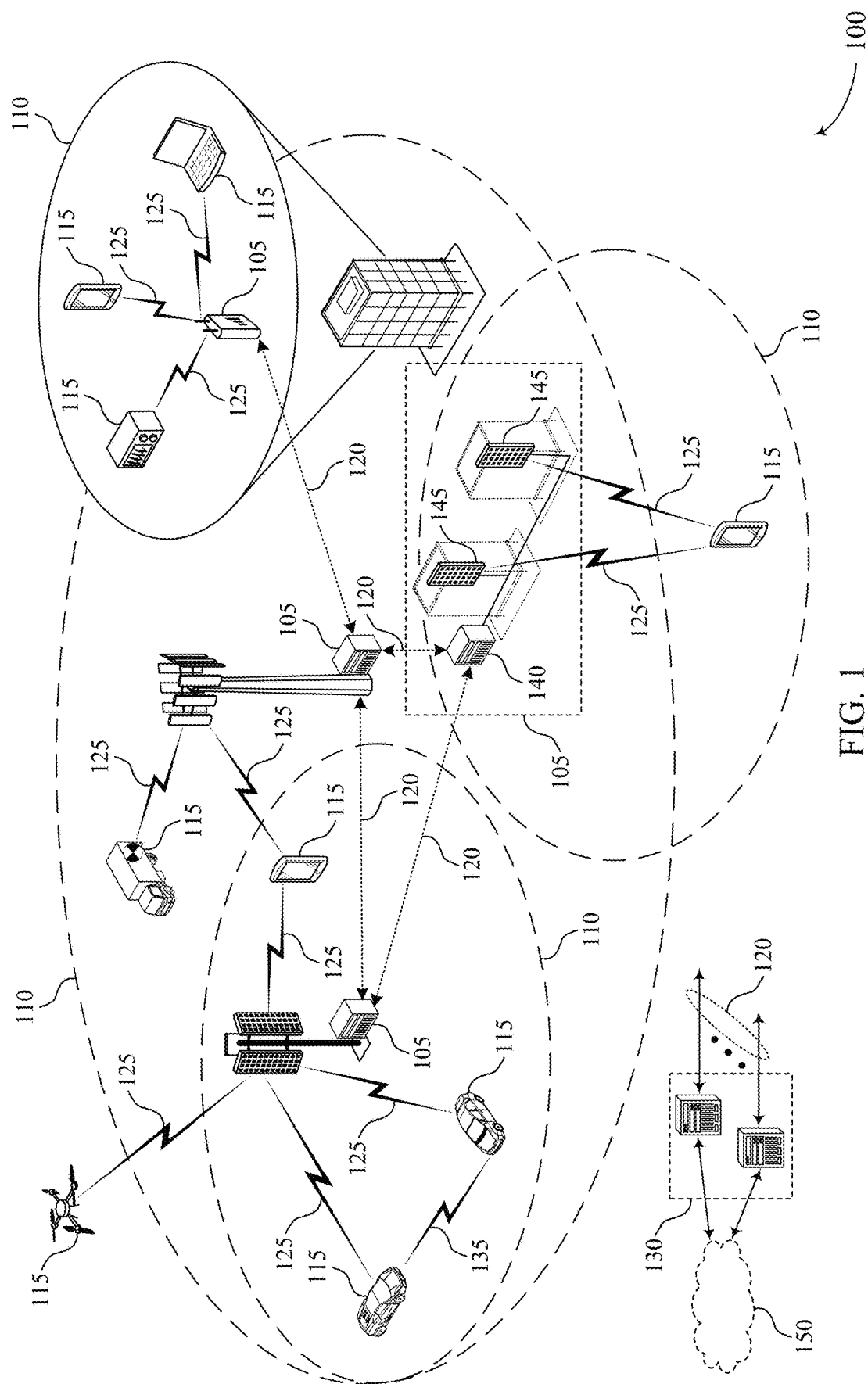
FIG. 1 illustrates an example of a wireless communications system that supports proactive communication of hybrid beamforming parameters between devices in accordance with aspects of the present disclosure.

Some wireless communications systems may support beamformed communications between two or more devices. Each device may represent an example of a user equipment (UE), a base station, an integrated access and backhaul (IAB) node, an intelligent reflecting surface (IRS) node, a relay node, a repeater, a customer-premises equipment (CPE), or some other network node. A first device and a second device may perform a beam refinement process to identify and select one or more beams to use for communications. The beam refinement process may include, for example, the first device transmitting reference signals to the second device, the second device measuring the reference signals and selecting or determining a beam and a corresponding set of beam weights to use based on the measurements, and the second device indicating the selected beam information to the first device.

The second device may, in some cases, determine the beam information by performing an optimization procedure over a set of multiple potential beams and corresponding sets of beam weights based on the measurements of the reference signals. However, such optimization may be associated with relatively large overhead and processing at the second device. In some cases, the first device may support more power and processing capabilities than the second device, which may provide for the first device to learn, using machine learning methods or other estimation procedures, channel information associated with a channel at the second device based on metrics collected from one or more other devices in the network.

Techniques described herein may leverage one or more capabilities of the first device to assist the second device in determining beamforming parameters or other system parameters, which may reduce processing time, processing complexity, and power consumption at the second device. For example, the first device may calculate (e.g., determine, estimate, or predict) the beamforming parameters based on estimation by a learning model of channel information associated with at least a portion of a communication link at the second device. The learning model may be a machine learning model or some other estimation procedure, such as a prediction or estimation algorithm. The first device may indicate the set of beamforming parameters to the second device and the second device may use the indicated beamforming parameters as an input or a starting point for a beam refinement process performed at the second device. By inputting the indicated beamforming parameters into the beam refinement procedure, the second device may reduce or narrow a search space over which the second device may search for beams and beam weights to use for communications. In some cases, the second device may utilize a quantity of radio frequency (RF) chains for beamforming that may be less than a quantity of antenna elements at the second device. In such cases, the beamforming may be referred to as hybrid beamforming and the beamforming parameters may be referred to as hybrid beamforming parameters.

The first device may input one or more measured parameters (e.g., model parameters) into the learning model based on measurements performed by the second device, by one or more other devices in the network, or both. For example, the first device may receive one or more messages from the second device that indicate measurements of model parameters. Additionally or alternatively, the first device may receive one or more messages from one or more other devices in communication with the first device, and the one or more messages may indicate measurements of model parameters obtained by the one or more other devices. The first device may input the received measurements into the learning model. The first device may utilize outputs of the learning model to calculate or estimate system parameters, such as the hybrid beamforming parameters, for the second device. The calculated hybrid beamforming parameters may preemptively indicate a starting point for a beam refinement process by the second device (e.g., before the second device initiates the beam refinement process).

The measured model parameters that are input to the learning model may include beam information associated with a third device in relatively close proximity to the second device, signal strength measurements of one or more reference signals transmitted to the second device, an indication of a hand grip state associated with a hand holding the second device, one or more other model parameters, or any combination thereof. The beamforming parameters indicated to the second device may include beam codebook adjustment information, estimated channel parameters of a channel at the second device, a set of beam weights to be applied by the second device, estimated angular spread of a cluster used in directional communication between the first device and the second device, one or more other beamforming parameters, or any combination thereof.

The second device may perform the beam refinement procedure based on the indicated beamforming parameters to identify or select one or more beams to use for communications. The first device and the second device may communicate using the one or more beams. Accordingly, the first device may utilize a learning model to estimate beamforming parameters for the second device to use, which may reduce complexity and latency associated with selecting the beams for communications.

Aspects of the disclosure are initially described in the context of wireless communications systems. Additional aspects of the disclosure are described with reference to communication diagrams and process flows. Aspects of the disclosure are further illustrated by and described with reference to apparatus diagrams, system diagrams, and flowcharts that relate to proactive communication of hybrid beamforming parameters between devices.

FIG. 1 illustrates an example of a wireless communications system 100 that supports proactive communication of hybrid beamforming parameters between devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a device in the wireless communications system 100 may proactively or preemptively predict one or more system parameters for a second device to use, for example, to reduce complexity associated with a beam refinement process, or for other communications. The device may be a UE 115, a base station 105, an IAB node, an IRS node, a relay node, a repeater, or a CPE, or some other network node. For example, a first device may utilize a learning model to calculate hybrid beamforming parameters for communications with a second device. The first device may calculate the hybrid beamforming parameters based on estimates of channel information associated with at least a portion of a communication link at the second device by the learning model. The first device may input, to the learning model, measured parameters based on measurements performed by the second device, by one or more other devices in the wireless communications system 100, or both. The first device may transmit a message (e.g., a feedback message) to the second device to indicate the hybrid beamforming parameters.

The second device may utilize the indicated hybrid beamforming parameters as an input to a beam refinement process at the second device. For example, the hybrid beamforming parameters may correspond to a starting point or an initial search space for the beam refinement process. The second device may perform the beam refinement process based on the hybrid beamforming parameters to identify one or more beams. The second device may communicate with the first device using the one or more beams based on the beam refinement process. The first device may thereby assist the second device in performing the beam refinement process, which may improve reliability and reduce processing power, complexity and latencies.

Figure 2:
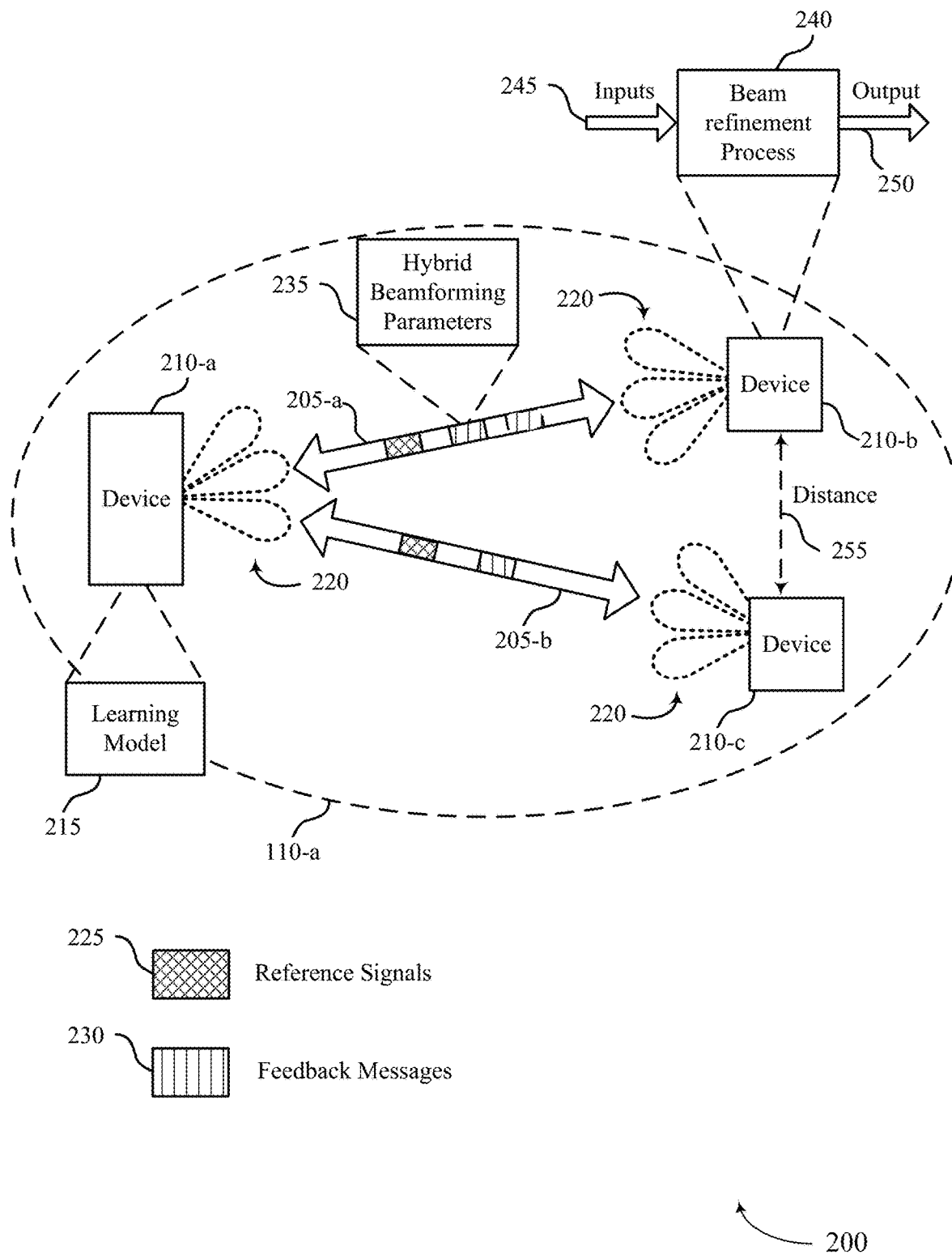
FIG. 2 illustrates an example of a wireless communications system that supports proactive communication of hybrid beamforming parameters between devices in accordance with aspects of the present disclosure.

FIG. 2 illustrates an example of a wireless communications system 200 that supports proactive communication of hybrid beamforming parameters between devices in accordance with aspects of the present disclosure. The wireless communications system 200 may implement or be implemented by aspects of the wireless communications system 100 as described with reference to FIG. 1. For example, the wireless communications system 200 may include devices 210-a, 210-b, and 210-c, which may each represent an example of a base station 105, a UE 115, a network node, an IAB node, an IRS node, a relay node, a repeater, or a CPE, as described with reference to FIG. 1. The devices 210 may communicate within a geographic coverage area 110-a and via a respective communication link 205 (e.g., communication links 205-a and 205-b). The communication links 205 may be any type of communication link 205, including a Uu link, a sidelink, or both.

The devices 210-a, 210-b, and 210-c may each support beamformed communications using a set of beams 220. In some cases, one or more devices 210 may perform beam refinement to select one or more beams 220 to use for communications. For example, the device 210-a may transmit reference signals 225 (e.g., CSI-RSs, sounding reference signals (SRSs), synchronization signal blocks (SSBs), other reference signals 225, or any combination thereof) to the device 210-b via the communication link 205-a. The device 210-b may select a beam 220 to use during communications with the device 210-a based on measurements of the reference signals 225 and an optimization procedure associated with the measurements of the reference signals 225. The optimization procedure may include estimating or calculating, by the device 210-b, one or more beams 220 that may optimize or improve at least one metric, such as a reference signal received power (RSRP), a spectral efficiency, or some other metric for communications. The device 210-b may transmit a feedback message 230 to the device 210-a to indicate the selected beam 220.

In the example of FIG. 2, the devices 210 may include or support relatively large antenna arrays, which may provide for improved communication reliability and throughput via relatively high frequency ranges and spectral allocations (e.g., FR3, FR2, and above). For example, each of the devices 210-a, 210-b, and 210-c may include multiple antenna elements. In some examples, a device 210 may include multiple antenna modules (e.g., panels) that each include a set of antenna elements. The device 210 may support beamforming from the multiple antenna elements, which may improve link budget. The antenna elements within each module may be co-phased during beamforming. As described herein, a quantity of RF chains used for signaling by a device 210 may be smaller than a quantity of antenna elements on the device 210. In such cases, beamforming by the device 210 may be referred to as hybrid (e.g., analog in the case of a single RF chain) beamforming, which may be different than digital beamforming by a device 210 that includes a same quantity of RF chains as antenna elements.

As antenna complexity increases, beam refinement procedures for hybrid beamforming may be associated with relatively large processing complexities, power consumption, and thermal overhead. For example, after receiving the reference signals 225 from the device 210-a, the device 210-b may perform an optimization or other selection procedures that searches over a relatively large quantity of beams 220 and corresponding hybrid beamforming parameters 235 to select a beam 220 to use for communications. In some cases, the device 210-a may not assist the device 210-b in determining a beam 220, hybrid beamforming weights, or other system parameters (e.g., reference signal design). It may be beneficial for the device 210-a to assist the device 210-b in performing an enhanced beam refinement process 240 to reduce processing and power consumption at the device 210-b.

As described herein, a first device 210 may estimate channel information associated with a channel or a portion of a communication link at a second device 210 using a learning model 215. The first device 210 may utilize the estimated channel information to calculate system parameters, such as hybrid beamforming parameters 235, for the second device 210. A feedback message 230 may convey the calculated parameters from the first device 210 to the second device 210. In some examples, the described techniques may leverage enhanced capabilities of the first device 210 to reduce processing complexity and power consumption at the second device 210. For example, one or more of the devices 210 within the wireless communications system 200 may support enhanced capabilities as compared with the other devices 210. For example, a base station 105 or a network node may, in some cases, support more capabilities, such as improved processing or power capabilities, than a UE 115. Additionally or alternatively, a first UE 115 may support improved capabilities as compared with a second UE 115.

A device 210 that supports enhanced capabilities may be operable to calculate or estimate channel information associated with other devices 210 using a learning model 215. For example, the device 210-a may support more processing and power capabilities than the device 210-b, which may provide for the device 210-a to collect data from one or more devices 210 in the network and input the collected data to a learning model 215 to predict, calculate, or estimate information about the device 210-*b*. The learning model 215 may be an example of a machine learning model or some other prediction-based algorithm (e.g., reinforcement learning or statistics-based learning).

The learning model 215 may process the inputs sent to the learning model by the device 210-*a* and determine (e.g., estimate, predict, or calculate) output values. In some examples, the learning model 215 may utilize a predication algorithm. For example, the learning model may be a statistical-based model that may estimate or calculate predicted metrics. In some other examples, the learning model 215 may utilize a machine learning algorithm. For example, the learning model 215 may represent an example of a neural net, such as a feed forward (FF) or a deep feed forward (DFF) neural network, a recurrent neural network (RNN), a long/short term memory (LSTM) neural network, or any other type of neural network. The learning model 215 may be associated with a machine learning algorithm that may implement a nearest neighbor algorithm, a linear regression algorithm, a Naïve Bayes algorithm, a random forest algorithm, or any other machine learning algorithm. Furthermore, the learning model 215 may utilize supervised learning, unsupervised learning, semi-supervised learning, reinforcement learning, or any combination thereof. However, any other learning models 215 and corresponding algorithms may be supported by the device 210-*a*. The prediction or estimation modeled by the learning model 215 may be performed or generated prior to deployment of the device 210-*a*, while the device 210-*a* is deployed, during low usage periods of the device 210-*a* while the device 210-*a* is deployed, or any combination thereof.

In the example of FIG. 2, the device 210-*a* (e.g., the first device) may estimate, via the learning model 215, channel information associated with a channel at the device 210-*b* (e.g., the second device), such as a portion of the communication link 205-*a* at the device 210-*b*. The device 210-*a* may send input values to the learning model 215. The input values may include model parameters, such as measured parameters based on measurements performed by the device 210-*b*, by one or more other devices 210 in the network, such as the device 210-*c*, or both. For example, the model parameters may include a first set of hybrid beamforming parameters 235 associated with the device 210-*c*, a set of signal strength measurements obtained by the device 210-*b*, the device 210-*c*, or both, a value indicative of a hand grip state associated with the device 210-*b*, or any combination thereof.

The device 210-*a* may utilize the estimates of the channel information associated with the channel at the device 210-*b* via the learning model 215 to calculate one or more system parameters for the device 210-*b*. For example, the device 210-*a* may calculate a set of hybrid beamforming parameters 235 for the device 210-*b* based on estimates, by the learning model 215, of channel information associated with a channel at the device 210-*b*. The device 210-*a* may transmit a feedback message 230 to the device 210-*b* to indicate the hybrid beamforming parameters 235. The hybrid beamforming parameters 235 may include, for example, values used to generate one or more beams 220 within a beamforming codebook for use by the device 210-*b* including adjusting the beam properties such as main lobe direction(s), side lobe direction(s), beamwidths, etc., an estimated angular spread associated with a cluster capturing a channel matrix in the communication link 205-*a* between the device 210-*a* and the device 210-*b*, a set of initial hybrid beamforming weights associated with one or more beams 220 at the device 210-*b*, or any combination thereof.

The device 210-*b* may utilize the indicated hybrid beamforming parameters 235 as inputs 245 to a beam refinement process 240. The hybrid beamforming parameters 235 may provide a starting point for the beam refinement process 240, such as an indication of an initial search space over which the device 210-*b* may perform the beam refinement process 240. An output 250, or result, of the beam refinement process 240 may be one or more beams 220 for the device 210-*b*, a set of one or more hybrid beamforming weights for the device 210-*b*, or both. By inputting the hybrid beamforming parameters 235 to the beam refinement process 240, the device 210-*b* may reduce a complexity associated with selecting optimal hybrid beams 220 and weights.

After performing the beam refinement process 240, the device 210-*b* may transmit a feedback message 230 to the device 210-*a* to indicate the selected beams 220 and beam weights. The devices 210-*a* and 210-*b* may communicate via the communication link 205-*a* using the selected beams 220 and beam weights. As such, the device 210-*a* may estimate channel information at the device 210-*b* and may feedback one or more system parameters to the device 210-*b* to improve a beam refinement process 240 at the device 210-*b*. For example, the described techniques may reduce processing, latency, power consumption, and thermal effects of the beam refinement process 240 at the device 210-*b* while maintaining reliable communications.

The hybrid beamforming parameters 235 calculated by the device 210-*a* may vary based on which model parameter(s) are input to the learning model 215. In some examples, the device 210-*a* may input a first set of hybrid beamforming parameters 235 associated with the device 210-*c*. For example, the device 210-*a* may establish communications with the device 210-*c* via the communication link 205-*b* using the first set of hybrid beamforming parameters 235 (e.g., a first communication protocol). The device 210-*a* may receive position information associated with the device 210-*c* and the device 210-*b*. The device 210-*a* may determine, based on the position information, that the device 210-*c* is relatively close to the device 210-*b*, such that at least some of the first set of hybrid beamforming parameters 235 may be reused by the device 210-*b*. For example, the device 210-*a* may determine that a distance 255 between the device 210-*b* and the device 210-*c* is less than a threshold distance, or that the device 210-*b* and the device 210-*c* are positioned within a same geographic coverage are 110-*a* (e.g., a same cell, a same region), or both. Additionally or alternatively, the device 210-*a* may determine that the devices 210-*b* and 210-*c* communicate via a same carrier frequency, support a similar antenna module configuration or orientation, or both.

The device 210-*a* may input the first set of hybrid beamforming parameters 235 associated with the device 210-*c*, the position information associated with the devices 210-*b* and 210-*c*, or both into the learning model 215 based on determining that the device 210-*c* is proximal to the device 210-*b*. The first set of hybrid beamforming parameters 235 may include, for example, one or more beams 220, beam weights, codebook information associated with the device 210-*c*, frequency information associated with the device 210-*c*, antenna weights or filters applied at the device 210-*c*, position information associated with the device 210-*c*, or any combination thereof.

Based on the learning model 215, the first device 210-*a* may estimate that the channel information associated with the channel at the device 210-*b* may be relatively similar to a channel at the device 210-*c*. The device 210-*a* may calculate one or more values used to generate one or more beams 220 in a beamforming codebook for use by the device 210-*b* based on the estimates by the learning model 215. The device 210-*a* may transmit a feedback message 230 to the device 210-*b* to indicate the one or more values used to generate beams 220 within the beamforming codebook. The one or more values may include adjustments for scaling the beamforming codebook from a first carrier frequency to a second carrier frequency different than the first carrier frequency. Techniques for calculating adjusted codebook values are described in further detail elsewhere herein, including with reference to FIG. 3.

In some other examples, the device 210-*a* may input a set of signal strength measurements into the learning model 215. For example, the device 210-*a* may transmit reference signals 225 to the device 210-*b* via the communication link 205-*a*. The device 210-*b* may measure a signal strength of each reference signal 225 and transmit a feedback message 230 to the device 210-*a* to indicate the measured signal strength values. The device 210-*a* may utilize the measured signal strength values and the learning model 215 to calculate an estimated angular spread associated with a cluster capturing a channel matrix for the communication link 205-*a*. The device 210-*a* may transmit a feedback message 230 to the device 210-*b* to indicate the estimated angular spread. Such angular spread calculations are described in further detail elsewhere herein, including with reference to FIG. 3.

In some other examples, the device 210-*a* may input a value indicative of a hand grip state associated with the device 210-*b* into the learning model 215. The device 210-*b* may transmit a feedback message 230 to the device 210-*a* to indicate the hand grip state, which may represent a state of a hand (e.g., and corresponding fingers) that holds the device 210-*b*. The device 210-*a* may utilize the value indicative of the hand grip state and the learning model 215 to calculate an initial set of hybrid beamforming weights associated with one or more beams 220 at the device 210-*b*. The device 210-*a* may transmit a feedback message 230 to the device 210-*b* to indicate the estimated initial set of hybrid beamforming weights. Such hybrid beamforming weight estimations are described in further detail elsewhere herein, including with reference to FIG. 4.

A device 210 as described herein may thereby utilize measured parameters associated with one or more devices 210 and a learning model 215 to estimate or predict channel information associated with the one or more other devices 210 in a network. The device 210 may calculate hybrid beamforming parameters 235 for the one or more other devices based on the estimates by the learning model 215 and may transmit a feedback message 230 configured to convey an indication of the calculated hybrid beamforming parameters 235 to the one or more other devices. The other device(s) may utilize the indicated hybrid beamforming parameters 235 as a starting point, or an input, for a beam refinement process 240, which may increase a speed at which the beam refinement process 240 may be performed, reduce processing complexity, reduce power consumption, and reduce thermal overheads at the other device(s) 210.

Figure 3:
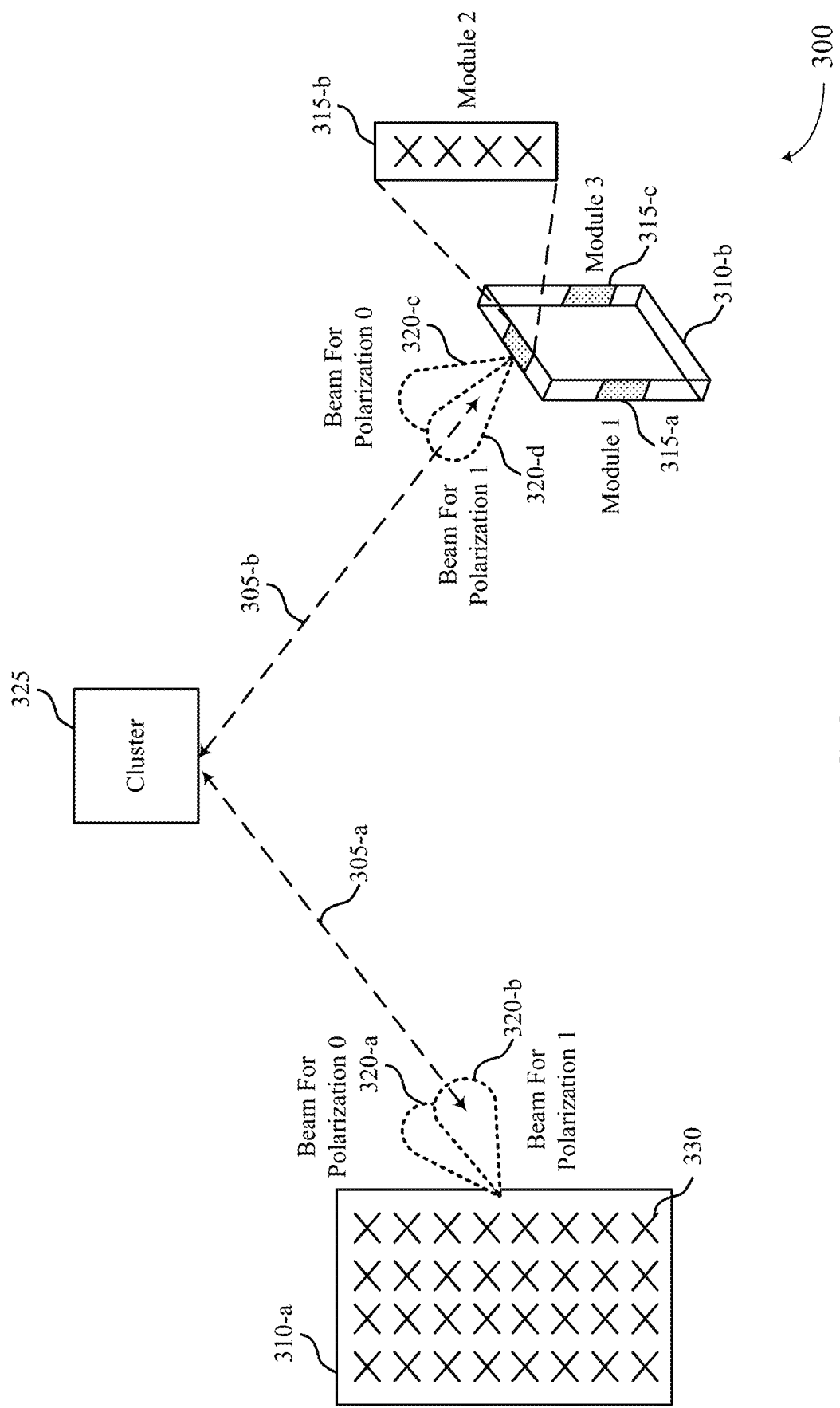
FIG. 3 illustrates an example of a communication diagram that supports proactive communication of hybrid beamforming parameters between devices in accordance with aspects of the present disclosure.

FIG. 3 illustrates an example of a communication diagram 300 that supports proactive communication of hybrid beamforming parameters between devices in accordance with aspects of the present disclosure. The communication diagram 300 may implement or be implemented by aspects of the wireless communications systems 100 and 200 as described with reference to FIGS. 1 and 2. For example, the communication diagram 300 may illustrate communications between a first device 310-*a* and a second device 310-*b*, which may represent examples of corresponding devices as described herein. The device 310-*a* and the device 310-*b* may each represent an example of a base station 105, a UE 115, a network node, an IAB node, an IRS node, a relay node, a repeater, or a CPE, as described with reference to FIGS. 1 and 2.

The devices 310-*a* and 310-*b* may support beamformed communications using one or more beams 320 (e.g., beams 320-*a*, 320-*b*, 320-*c*, and 320-*d*, among other beams 320), which may represent examples of beams 220 as described with reference to FIG. 2. The device 310-*a* and the device 310-*b* may communicate via a communication link 305 that may include a first portion 305-*a* at the device 310-*a* and a second portion 305-*b* at the device 310-*b*. For example, a channel between the devices 310 may be reflected off of a cluster 325. The first portion of the communication link 305-*a* may correspond to reflections and signals between the device 310-*a* and the cluster 325, and the second portion of the communication link 305-*b* may correspond to reflections and signals within a channel between the device 310-*b* and the cluster 325. The cluster 325 may represent an example of a reflective object (e.g., a vehicle, building, or other object having metallic or glass surfaces that reflect energy at millimeter wave carrier frequencies and beyond, or are otherwise associated with reflective properties).

The device 310-*a* and the device 310-*b* may each include one or more antenna elements 330. In the example of FIG. 3, the device 310-*a* may include a relatively large antenna module or array, which may include multiple antenna elements 330. The antenna array at the device 310-*a* may support beamformed communications via relatively high frequency ranges (e.g., FR3 and above). The device 310-*b* may include multiple antenna modules 315 (e.g., a multi-modular array including antenna modules 315-*a*, 315-*b*, 315-*c*, and 315-*d*). Each antenna module 315 may be referred to as a subarray and may include a quantity of antenna elements 330. For example, each antenna module 315 may include four antenna elements 330 (e.g., a four-by-one array), or some other quantity of antenna elements 330.

By utilizing multiple antenna modules 315 positioned in different locations on the device 310-*b*, the device 310-*b* may support spherical or near-spherical signal coverage. The device 310-*b* may transmit and/or receive beamformed communications from multiple different directions, and the device 310-*b* may support robust beam switching between the antenna modules 315. For example, the antenna module 315-*b* may support a portion of the signal coverage of the device 310-*a* (e.g., 90 degrees, or some other portion). If an orientation of the device 310-*b* is shifted or rotated, the device 310-*b* may perform beam switching to utilize the antenna module 315-*a*, for example, to communicate via the communication link 305. Such beam switching over multiple antenna modules 315 may provide for relatively reliable throughput and signal coverage. In some examples, the described beam switching may reduce interference or latency associated with blockage that may be experienced by the device 310-*b* due to, for example, a hand or body that is near or holding the device 310-*b*.

The first and second devices 310 may each perform hybrid or analog beamforming using one or more beams 320, which may represent examples of beams 220 as described with reference to FIG. 2. In some cases, the device 310-*a* and the device 310-*b* may perform a beam refinement process, as described with reference to FIG. 2, to select a beam 320 for communication. The devices 310 may each perform the beam refinement process to learn about the respective portion of the communication link 305 at the device 310. For example, the device 310-*a* may transmit reference signals to the device 310-*b*, and the devices 310 may select (e.g., identify or learn) one or more beams 320 to use for communications based on measurements of the reference signals, as described with reference to FIG. 2.

The device 310-*a* may, in some cases, select (e.g., identify or learn) the beam 320-*b* for communicating with the device 310-*b* via the communication link 305 and a corresponding set of beamforming weights to apply for generating and steering the beam 320-*b* in the direction of the cluster 325. The device 310-*b* may select (e.g., identify or learn) the beam 320-*d* for communicating with the device 310-*a* via the communication link 305 and a corresponding set of beamforming weights to apply for generating and steering the beam 320-*d* in the direction of the cluster 325. The beams 320-*b* and 320-*d* may thus be steered or directed in the direction of the cluster 325, such that the energy produced or received by the beams 320-*b* and 320-*d* may be reflected off of the cluster 325 in the direction of the communication link 305.

If a second cluster 325 is present in the channel between the first and second devices 310-*a* and 310-*b*, the devices 310 may co-phase one or more antenna elements 330 in each module 315 or antenna array to create a composite beam 320 for communications. For example, the device 310-*a* may generate a composite beam including the beam 320-*a* (e.g., associated with polarization 0) and the beam 320-*b* (e.g., associated with polarization 1) to transmit or receive communications via the channel, and the device 310-*b* may generate a composite beam including the beam 320-*c* (e.g., associated with polarization 0) and the beam 320-*d* (e.g., associated with polarization 1) to transmit or receive communications via the channel. In some cases, the beams 320-*a* and 320-*b* at the device 310-*a* may be more narrow than the beams 320-*c* and 320-*d* at the device 310-*b* based on the antenna array at the device 310-*a* being larger than the antenna module 315-*b* at the device 310-*b*. Thus, the device 310-*a* may transmit and receive signals via the communication link 305 with more precise granularity and accuracy than the device 310-*b*.

In some cases, the cluster 325 may be seen to correspond to a first portion of the communication link 305-*a* from the device 310-*a* and a second portion of the communication link 305-*b* to the device 310-*b*. The first and second portions of the communication link 305 may be artificial distinctions used for channel modeling purposes. In such cases, the device 310-*a* may perform one or more measurements to estimate channel information associated with the first portion of the communication link 305-*a* and the device 310-*b* may perform one or more measurements to estimate channel information with the second portion of the communication link 305-*b*. The devices 310 may each select beams 320 based on the respective estimates of channel information.

Techniques described herein provide for the device 310-*a* to estimate channel information associated with the second portion of the communication link 305-*b* at the device 310-*b* using a learning model. The device 310-*a* may calculate, based on the estimates of the channel information via a learning model, system parameters for the device 310-*b*, which may reduce processing complexity, latency, and power consumption at the device 310-*b*. The learning model may represent an example of the learning model 215 described with reference to FIG. 2. In some examples, the estimated system parameters may be beamforming parameters for the device 310-*b*, which may be input to a beam refinement process at the device 310-*b* to reduce a search space over which the device 310-*b* searches for an optimal set of beam weights 320.

In some examples, the beamforming parameters may include a set of values within a codebook for generating or calculating an initial set of beamforming weights for the device 310-*b*. The device 310-*a* may calculate or predict the set of values based on, for example, a first set of beamforming parameters associated with one or more other devices 310 different than the device 310-*b*. The predicted set of values may provide an initial input or starting point for the device 310-*b* to use when selecting a beam 320 and corresponding weights, which may reduce latency in scenarios when the device 310-*b* switches between frequency ranges and corresponding antenna modules 315.

For example, the device 310-*b* and the device 310-*a* may communicate over one or more component carriers and corresponding carrier frequencies. In some examples, the device 310-*b* may support multi-modular beamforming over multiple antenna modules 315 (e.g., radio-frequency integrated circuits (RFICs)) placed at different locations of the device 310-*b*, and different antenna modules 315 at the device 310-*b* may be configured for or operable for different frequency ranges. For example, the antenna module 315-*a* may be associated with a first frequency range (e.g., 28-42 GHz, or some other frequency range) and the antenna module 315-*b* may support communications via a second (e.g., 42-71 GHz, or some other frequency range). If the device 310-*b* switches between frequencies during communications, the device 310-*b* may switch between antenna modules 315, which may include deactivating a first antenna module 315 associated with a first frequency range and activating a second antenna module 315 associated with a second frequency range during a time period (e.g., a gap period).

A quantity of antenna elements 330 in each antenna module 315 may be different for different frequency ranges, a spacing between antenna elements 330 within each antenna module 315 may be different, or both. As such, the device 310-*b* may derive different beamforming weights to apply for different operating frequencies (e.g., different software settings or other settings, including antenna weights or filters may be derived for each frequency). For example, a first set of beamforming weights may be derived for a first frequency range and applied to a first antenna module 315 that includes four antenna elements 330. A second set of beamforming weights may be derived for a second frequency range and applied to a second antenna module 315 that includes, for example, eight antenna elements 330.

The device 310-*b* may learn beamforming weights at one frequency and apply the learned weights for communications via another frequency. In some examples, the device 310-*b* may adjust or scale the beamforming weights based on differing quantities of antenna elements 330. However, as spacing between antenna elements 330 changes for different frequency ranges, applying beamforming weights to different frequencies may distort a generated beam 320, which may be referred to as beam squinting. For example, a planar array may be deployed with an inter-antenna element spacing, d, (e.g., a uniform array with a fixed inter-antenna element spacing) based on an anchor frequency (e.g., d may be equal to $\lambda/2$). The inter-antenna element spacing may be different for frequencies above or below the anchor frequency. If the device 310-*b* applies beam weights used for a first frequency (e.g., 60 GHz) to a second frequency (e.g., 71 GHz), the generated beam 320 may have beam squinting effects that may correspond to energy spewed or transmitted in undesired directions, which may create interference.

In some examples, the device 310-*b* may support different codebooks for each frequency range. The codebooks may include values used to generate one or more beams 320 at the respective frequency range. For example, a first codebook may include values for generating beams 320 at a first frequency (e.g., 60 GHz) and a second codebook may include values for generating beams 320 at a second frequency (e.g., 71 GHz). If the device 310-*b* switches between component carriers, the device 310-*b* may load a different codebook associated with the target component carrier. Loading the codebook (e.g., from a memory of the device 310-*b*) may take time, which may increase latency associated with frequency switching. In some cases, a time period for the device 310-*b* to switch frequencies may be shorter than a time period in which the device 310-*b* loads a codebook.

As described herein, the device 310-*a* may obtain measured parameters from one or more other devices 310 and input the measured parameters into a learning model to learn or estimate channel information and other behaviors associated with one or more devices 310. To reduce latency associated with tuning between frequencies, the device 310-*a* may store information related to carrier frequencies on which other devices 310 operate and which codebooks or codebook values the devices 310 utilize on each frequency. In some examples, a database at the device 310-*a* may include mappings between a respective carrier frequency and a codebook or a set of values within the codebook.

The device 310-*a* may indicate, to the device 310-*b*, to switch from a first frequency to a second frequency within a time period. The time period may be less than a time period in which the device 310-*b* may load a codebook. The device 310-*a* may reduce latency by transmitting a feedback message to the device 310-*b* to indicate one or more values within a codebook for the device 310-*b* to use for generating a beam 320, a set of beamforming weights, or both. The device 310-*a* may calculate the values based on the information obtained from other devices 310 in the network. For example, the device 310-*a* may calculate the values based on a mapping between the second frequency and the values of the codebook in the database at the device 310-*a*. The values in the codebook may include adjustments for scaling a beamforming codebook at the device 310-*b* from the first frequency to the second frequency.

The device 310-*b* may utilize the indicated values to determine an initial set of beamforming weights to use for generating one or more beams 320 for communications with the device 310-*a* on the second frequency. The device 310-*b* may load a codebook associated with the second frequency after receiving the feedback message from the device 310-*a*, and the device 310-*b* may subsequently switch to communicating based on the loaded codebook. The initial indication of the beamforming parameters may provide for the device 310-*b* to switch to communicating on the second frequency faster than if the device 310-*b* waits for the codebook to load.

In some examples, a third device 310 may be relatively close to the device 310-*b*. For example, the third device 310 may be within a threshold distance of the device 310-*b*, as described with reference to FIG. 2. The third device 310 may establish communications with the device 310-*a* via a respective communication link that may reflect off of the same cluster 325 as the communication link 305 between the device 310-*a* and the device 310-*b*. The third device 310 may establish the communications using a first set of beamforming parameters, including, for example, a set of beams 320, a set of beamforming weights, a set of values within a codebook, or any combination thereof.

In such cases, the device 310-*a* may input the first set of beamforming parameters associated with the third device 310, position information associated with the third device 310, position information associated with the device 310-*b*, or any combination thereof into a learning model. The device 310-*a* may estimate channel information associated with the device 310-*b* based on the learning model and determine that the channel information is relatively similar to the channel information associated with a channel at the third device 310. In some examples, the third device 310 may communicate via a same frequency as the device 310-*b*. The device 310-*a* may calculate beamforming parameters for the device 310-*b* based on the estimated channel information and the learning model.

The device 310-*a* may indicate the calculated (e.g., predicted) beamforming parameters to the device 310-*b*. In some examples, the beamforming parameters may be the same as the first set of beamforming parameters used by the third device 310 based on the third device 310 being relatively proximal to the device 310-*b*. The beamforming parameters may include, for example, one or more values for generating a beam 320 in a beamforming codebook, initial beamforming weights, or both. The device 310-*a* may therein feed information to the device 310-*b* to indicate a starting point or a search space for the device 310-*b* (e.g., a local search) based on establishing communications with another device 310.

In some examples, the device 310-*b* may determine beam weights to be used for transmission or reception based on one or more cluster properties associated with the cluster 325. The cluster properties may include an angular spread (e.g., in azimuth or elevation or both) at the device 310-*b*. The angular spread may correspond to a distance or area over which the cluster 325 is spread in terms of signal propagation and reflection of energy from the cluster 325 to the device 310-*b* (e.g., an area over which the second portion of the communication link 305-*b* is spread). For example, a relatively narrow angular spread may correspond to a frequency selective performance with finer granularity (e.g., a user of a static progressive phase shift beam 320) than a relatively wide angular spread, which may correspond to a wider coverage area (e.g., a use of dynamic set of beam weights).

The device 310-*b* may, in some cases, determine which beam weights (e.g., progressive phase shift or non-progressive phase shift) to use for communications via the communication link 305 based on reference signals received from the device 310-*a* (e.g., CSI-RSs, SRSs, or other reference signals). However, as a quantity of antenna elements 330 at the device 310-*b* increase (e.g., for communications via increasing frequency ranges), a quantity of reference signals for beam weight estimation may increase (e.g., a quadratic increase), which may provide for increased power consumption and thermal overhead as more symbols may be used for signal strength measurements and feedback.

As described herein, the device 310-*a* may estimate angular spread at the device 310-*b* and utilize this information to assist beam refinement at the device 310-*a*. For example, the device 310-*a* may transmit a set of one or more contiguous and spatially adjacent reference signals to the device 310-*b*. Each reference signal may be transmitted using a respective beam 320 of a set of beams 320 at the device 310-*a*. Each beam 320 may correspond to a steering angle that may be neighborly to a serving beam 320 over which a communication link 305 has been established. For example, the reference signals may be steered toward spatially adjacent directions. In some examples, the device 310-*a* may indicate, to the device 310-*b*, a type of spatially adjacent beams 320 that may be scheduled.

The device 310-*b* may measure signal strengths associated with each of the reference signals (e.g., RSRP, reference signal received quality (RSRQ), or other signal strength metrics). The device 310-*b* may transmit a feedback message or some other signaling to the device 310-*a* to indicate the signal strength measurement(s) for each reference signal. The device 310-*a* may input the signal strength measurements into a learning model to estimate channel information at the device 310-*b*. The device 310-*a* may calculate or estimate, based on the learning model, an angular spread experience by the device 310-*b*. The estimated angular spread may be associated with or based on the cluster 325 capturing a channel matrix of a channel between the devices 310-*a* and 310-*b*. The device 310-*a* may, in some examples, determine a quantity of beams 320 associated with a signal strength that exceeds a threshold signal strength. The device 310-*a* may calculate the estimated angular spread based on the quantity of beams 320 that exceed the threshold signal strength.

The device 310-*a* may indicate the estimated angular spread to the device 310-*b* via a feedback message. The device 310-*b* may utilize the estimated angular spread to select beams 320, beam weights, or both to use for transmitting or receiving communications via the communication link 305.

The device 310-*a* may thereby estimate channel information associated with a portion of a communication link 305-*b* at the device 310-*b*. The device 310-*a* may estimate the channel information and calculate system parameters for the device 310-*b* based on a learning model. The device 310-*a* may indicate the estimated parameters to the device 310-*b*, which may improve communication reliability and reduce power consumption and latency by the device 310-*b*.

Figure 4:
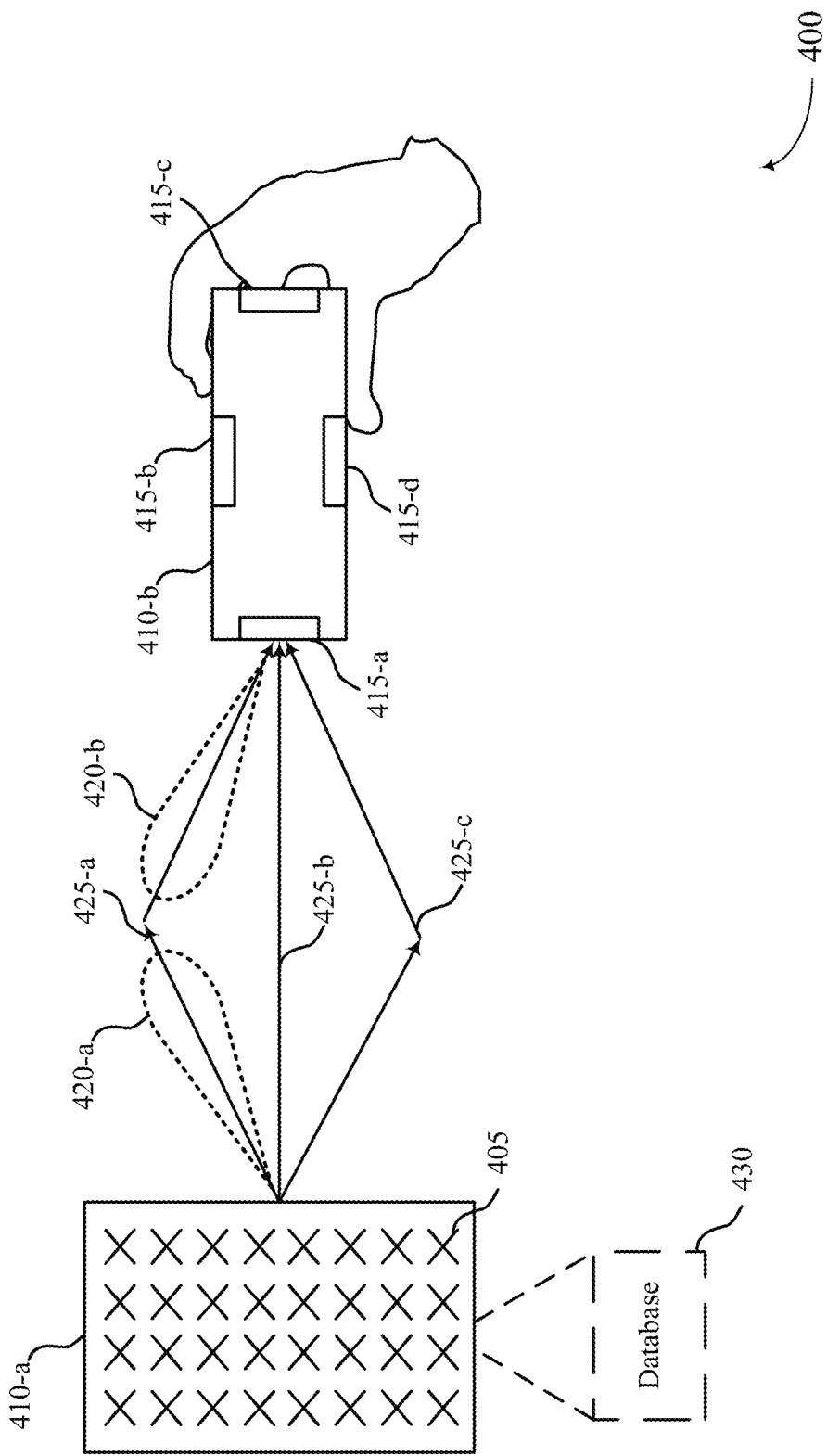
FIG. 4 illustrates an example of a communication diagram that supports proactive communication of hybrid beamforming parameters between devices in accordance with aspects of the present disclosure.

FIG. 4 illustrates an example of a communication diagram 400 that supports proactive communication of hybrid beamforming parameters between devices in accordance with aspects of the present disclosure. The communication diagram 400 may implement or be implemented by aspects of the wireless communications systems 100 and 200 as described with reference to FIGS. 1 and 2. For example, the communication diagram 400 may illustrate communications between a first device 410-*a* and a second device 410-*b*, which may each represent an example of a base station 105, a UE 115, a network node, an IAB node, an IRS node, a relay node, a repeater, or a CPE, as described with reference to FIGS. 1 through 3.

The devices 410-*a* and 410-*b* may support beamformed communications using one or more beams 420, which may represent examples of beams as described with reference to FIGS. 1 through 3. The devices 410 may communicate via one or more signaling paths 425 (e.g., communication links, channels), including the signaling paths 425-*a*, 425-*b*, and 425-*c*. In some examples, a beam 420 may be associated with a respective signaling path 425. For example, the beam 420-*a* at the first device 410-*a* and the beam 420-*b* at the second device 410-*b* may each be associated with, or steered in the direction of, the signaling path 425-*a*.

Each of the devices 410-*a* and 410-*b* may include multiple antenna elements 405, which may represent examples of the antenna elements 330 described with reference to FIG. 3. The device 410-*b* may include multiple antenna modules 415 (e.g., subarrays, panels), which may represent examples of the antenna modules 315 described with reference to FIG. 3. For example, each antenna module 415 may include a set of multiple antenna elements 405. The antenna modules 415 may be positioned on one or more sides or surfaces of the device 410-*b* to improve signaling coverage, as described in further detail with reference to FIG. 3.

The device 410-*b* may be a mobile device, such as a UE (e.g., a phone or a tablet), that may be held by a user. The user's hand and fingers that hold the device 410-*b* may occlude or interfere with one or more of the antenna elements 405 and/or antenna modules 415 of the device 410-*b*. In the example of FIG. 4, the user's hand may occlude the antenna module 415-*c* and may at least partially block or interfere with energy produced by one or both of the antenna modules 415-*b* and 415-*d* due to the relative proximity of the fingers to the antenna modules 415-*b* and 415-*d*.

The presence of the hand on top of or near the antenna modules 415 may reflect signals generated by the respective antenna modules 415. For example, signals may be reflected between the hand and the antenna modules 415 of the device 410-*b*, which may distort signal strength and cause interference. In some examples, indentations in the hand and skin may correspond to a magnitude similar to a wavelength of the signals generated by the device 410-*b* (e.g., on the order of millimeters), which may provide for increased signal distortion as a communication frequency increases.

As described herein, the device 410-*b* may determine a state of the hand holding the device 410-*b*, which may be referred to herein as a hand grip state. For example, the device 410-*b* may be equipped with one or more sensors operable to measure hand grip parameters associated with the hand holding the device 410-*a*. The hand grip parameters may include a reflective property of the hand, a grip arrangement of the hand, a quantity of fingers of the hand that occlude or otherwise interfere with one or more antenna elements 405 of the device 410-*b*, an application executed by the device 410-*b* (e.g., a gaming application or other application that may be indicative of a certain hand position), other parameters indicative of a position or orientation of the hand relative to the antenna modules 415, or any combination thereof. The sensors may measure the hand grip parameters based on measurements of pilot signals transmitted or received at one or more of the antenna modules 415.

The device 410-*b* may transmit a feedback message to the device 410-*a* to indicate the hand grip state, the hand grip parameters, or both. In some examples, a set of potential hand grip states may be defined and the device 410-*b* may transmit an indication of an index of the hand grip state from a set of indices associated with the set of defined hand grip states.

Additionally or alternatively, the device 410-*a* may include or support a database 430 that may be indicative of multiple potential hand grip states. For example, the device 410-*a* may input hand grip parameters received from multiple other devices 410 into a learning model, such as a machine learning model or a statistics-based learning model, as described with reference to FIG. 2. The device 410-*a* may generate the database 430 of potential hand grip states and corresponding beamforming parameters based on the learning model. The beamforming parameters may include, for example, sets of one or more beamforming weights that may be applied to the antenna elements 405 of a device 410 to perform reliable communications in each hand grip state. The device 410-*a* may store each hand grip state and corresponding beamforming parameters in the database 430, which may be referred to as a machine learning database.

In such cases, the device 410-b may transmit an indication of the measured hand grip parameters to the device 410-a via the feedback message, and the device 410-a may correlate the indicated hand grip parameters (e.g., sensor states) with a hand grip state from the database 430. The device 410-a may transmit a feedback message to the device 410-b to indicate the beamforming parameters associated with or linked to the hand grip state in the database 430. In some examples, the device 410-a may transmit an indication of a set of initial beamforming weights for the device 410-b to use for communications. For example, the device 410-a may indicate an initial set of beamforming weights (e.g., hybrid beamforming weights) for the device 410-b to apply to at least the antenna module 415-a to generate the beam 420-b for communications via the signaling path 425-a. The indicated beamforming weights may reduce interference or signal distortion that may be caused by the illustrated hand grip state of the hand holding the device 410-b. The learning model may thereby predict or estimate beamforming weights that may be applied for a certain hand grip state.

The device 410-a may thereby estimate, based on the received hand grip state indication, channel information about a channel or signaling path 425 that may be supported by the device 410-b, and the device 410-a may calculate, based on the estimated channel information and a learning model, beamforming parameters for the device 410-b. The device 410-b may receive the indication of the initial sets of beamforming weights and apply the beamforming weights for communication with the device 410-a. The device 410-b may apply the indicated weights for a time period, or until the device 410-b calculates different beamforming weights based on measurements obtained by the device 410-b or other changes in communications.

Although FIG. 4 illustrates a hand holding the device 410-b, it is to be understood that the described techniques may apply to any object or body part that may hold or be relatively proximate to the device 410-b (e.g., a phone holder, a charging pad, or the like). For example, the database 430 at the device 410-a may store potential obstruction states each associated with a respective set of sensor measurements at the device 410-b due to any object. The described techniques may reduce power consumption by the device 410-b and reduce latency associated with beam selection. Additionally or alternatively, by using a learning model to predict initial beam weights for each hand grip state, the device 410-a may improve reliability and throughput for one or more devices 410 in the network.

Figure 5:
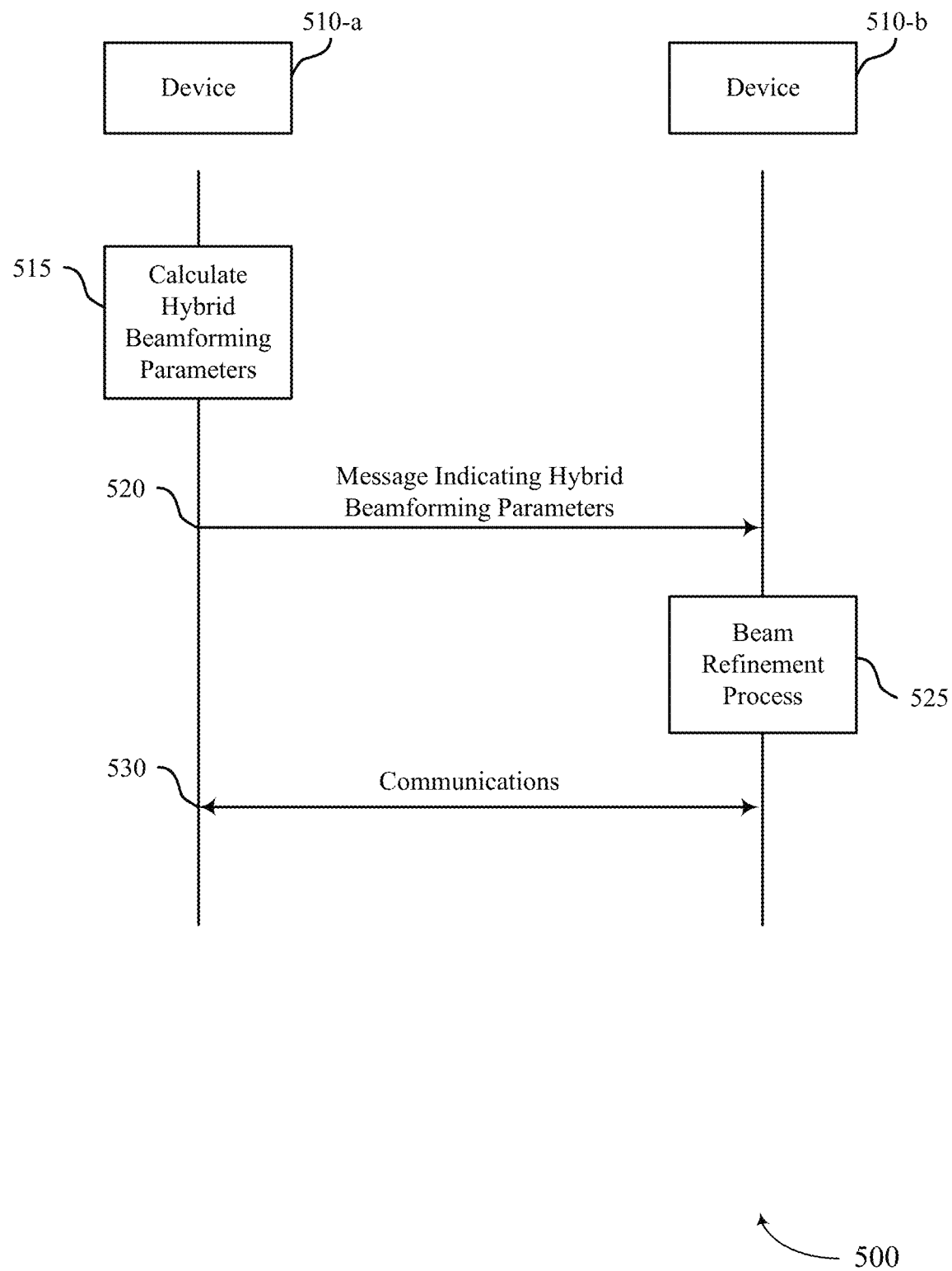
FIG. 5 illustrates an example of a process flow that supports proactive communication of hybrid beamforming parameters between devices in accordance with aspects of the present disclosure.

FIG. 5 illustrates an example of a process flow 500 that supports proactive communication of hybrid beamforming parameters between devices in accordance with aspects of the present disclosure. In some examples, the process flow 500 may implement or be implement by aspects of the wireless communications systems 100 or 200, and the communication diagrams 300 and 400, as described with reference to FIGS. 1 through 4. For example, the process flow 500 may illustrate a first device 510-a and a second device 510-b calculating hybrid beamforming parameters, exchanging a message indicating the hybrid beamforming parameters, performing a beam refinement process, and communicating based on the beam refinement process and the hybrid beamforming parameters, as described with reference to FIGS. 1 through 4.

The process flow 500 may include a first device 510-a and a second device 510-b, which may be examples of corresponding devices as described herein. In particular, the first device 510-a, the second device 510-b, or both may represent an example of a UE, an IAB node, an IRS node, a relay node, a repeater, or a CPE, as described with reference to FIGS. 1 through 4. It is noted that the operations in the process flow 500 performed by the first device 510-a and the second device 510-b may be respectively performed by any other wireless device, and the example shown should not be construed as limiting. For instance, the operations shown as performed by the first device 510-a and the second device 510-b may be performed by any type of wireless device.

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the first device 510-a may calculate hybrid beamforming parameters for communications with the second device 510-b. The first device 510-a may calculate the hybrid beamforming parameters based on one or more estimations of channel information associated with at least a portion of a communication link at the second device via a machine learning model. The first device 510-a may input, to the machine learning model, measured parameters based on measurements performed by the second device 510-b, by one or more other devices 510, or both. The model parameters may include, for example, hybrid beamforming parameters associated with a third device 510 that is approximate to the second device 510-b, signal strength measurements obtained by the second device 510-b, an indication of a hand grip state associated with a hand that holds the second device 510-b, or any combination thereof. In some examples, the first device 510-a may calculate one or more other system parameters for communications with the second device 510-b in addition to or instead of the hybrid beamforming parameters.

At 520, the first device 510-a may transmit a message indicating the hybrid beamforming parameters to the second device 510-b. The hybrid beamforming parameters may include an input to a beam refinement process at the second device 510-b. For example, the hybrid beamforming parameters may include values used to generate one or more beams in a beamforming codebook, an estimated angular spread associated with a cluster capturing a channel matrix for the communication link, a set of one or more initial hybrid beamforming weights, or any combination thereof.

At 525, the second device 510-b may perform the beam refinement process based on the hybrid beamforming parameters. The beam refinement process may indicate one or more beams from a set of multiple potential beams for the second device 510-b. In some examples, a search space over which the second device 510-b searches for the one or more beams during the beam refinement process may be reduced based on the hybrid beamforming parameters.

At 530, the first device 510-a and the second device 510-b may communicate using the one or more beams based on the beam refinement process.

Figure 6:
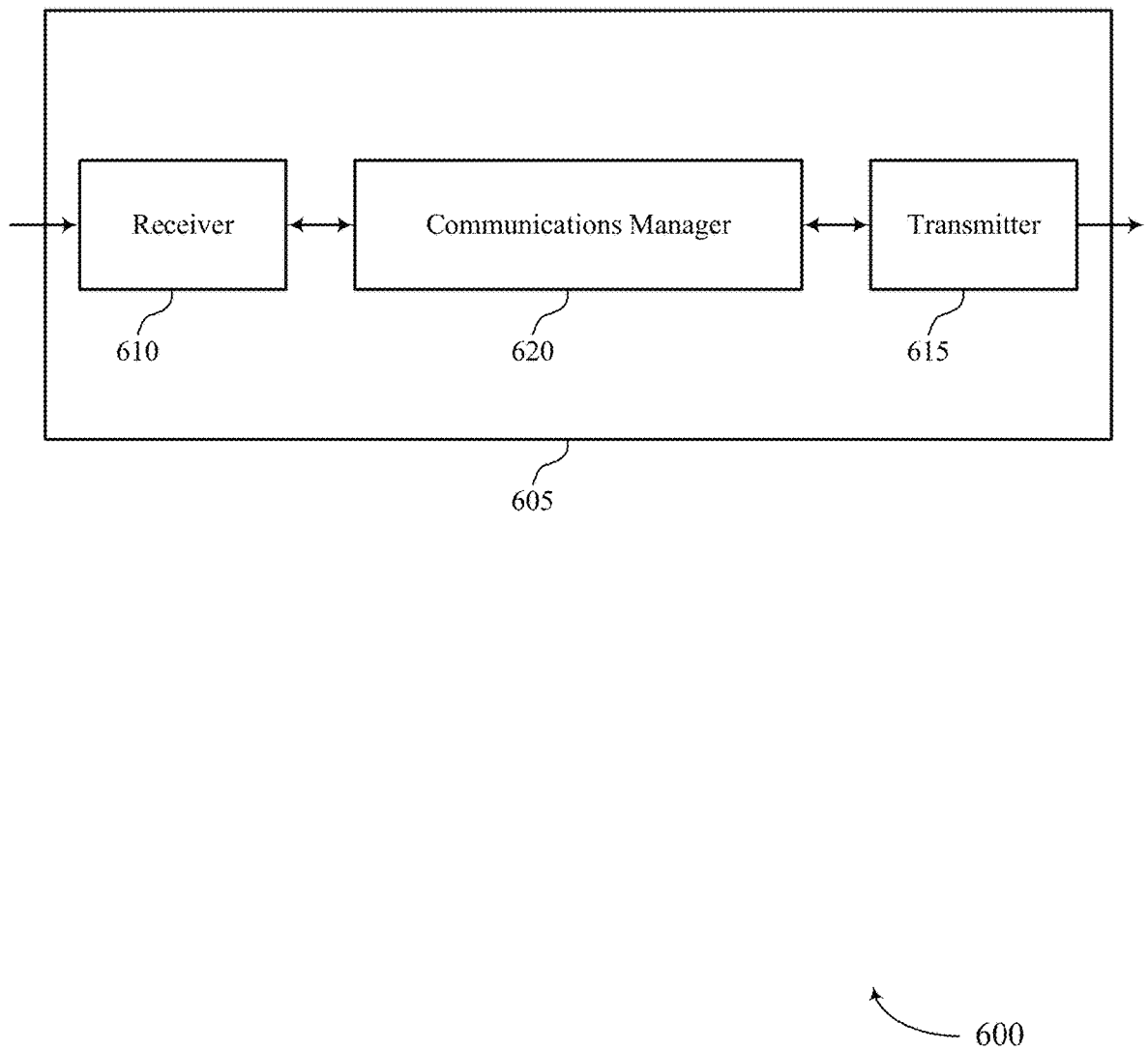
FIGS. 6 and 7 show block diagrams of devices that support proactive communication of hybrid beamforming parameters between devices in accordance with aspects of the present disclosure.

FIG. 6 shows a block diagram 600 of a device 605 that supports proactive communication of hybrid beamforming parameters between devices in accordance with aspects of the present disclosure. The device 605 may be an example of aspects of a UE, an IAB node, an IRS node, a relay node, a repeater, or a CPE, as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to proactive communication of hybrid beamforming parameters between devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to proactive communication of hybrid beamforming parameters between devices). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of proactive communication of hybrid beamforming parameters between devices as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for calculating hybrid beamforming parameters for communications with a second device based on an estimation of channel information associated with at least a portion of a communication link at the second device via a machine learning model, where inputs to the machine learning model include measured parameters based on measurements performed by the second device, by one or more other devices, or both. The communications manager 620 may be configured as or otherwise support a means for transmitting, to the second device, a message indicating the hybrid beamforming parameters, where the hybrid beamforming parameters include an input for a beam refinement process at the second device. The communications manager 620 may be configured as or otherwise support a means for communicating with the second device using one or more beams based on the hybrid beamforming parameters and a result of the beam refinement process.

Additionally or alternatively, the communications manager 620 may support wireless communication at a second device in accordance with examples as disclosed herein. For example, the communications manager 620 may be configured as or otherwise support a means for receiving, from a first device, a message indicating hybrid beamforming parameters for communications with a second device, where the hybrid beamforming parameters include an input for a beam refinement process at the second device. The communications manager 620 may be configured as or otherwise support a means for performing the beam refinement process based on the hybrid beamforming parameters, where a result of the beam refinement process indicates one or more beams from a set of multiple beams for the second device. The communications manager 620 may be configured as or otherwise support a means for communicating with the first device using the one or more beams based on the beam refinement process.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and reduced thermal overhead. For example, the device 605 may receive an indication of estimated system parameters, such as the hybrid beamforming parameters, from another device. The indicated parameters may provide an initial starting point for a beam refinement process by a processor of the device 605. By utilizing the parameters to perform the beam refinement process, the processor may reduce a search space over which the process is performed, which may reduce complexity, processing, and latency associated with selecting one or more beams. Additionally or alternatively, the reduced complexity of the beam refinement process may provide for reduced power consumption and corresponding thermal dissipation by the processor of the device 605.

Figure 7:
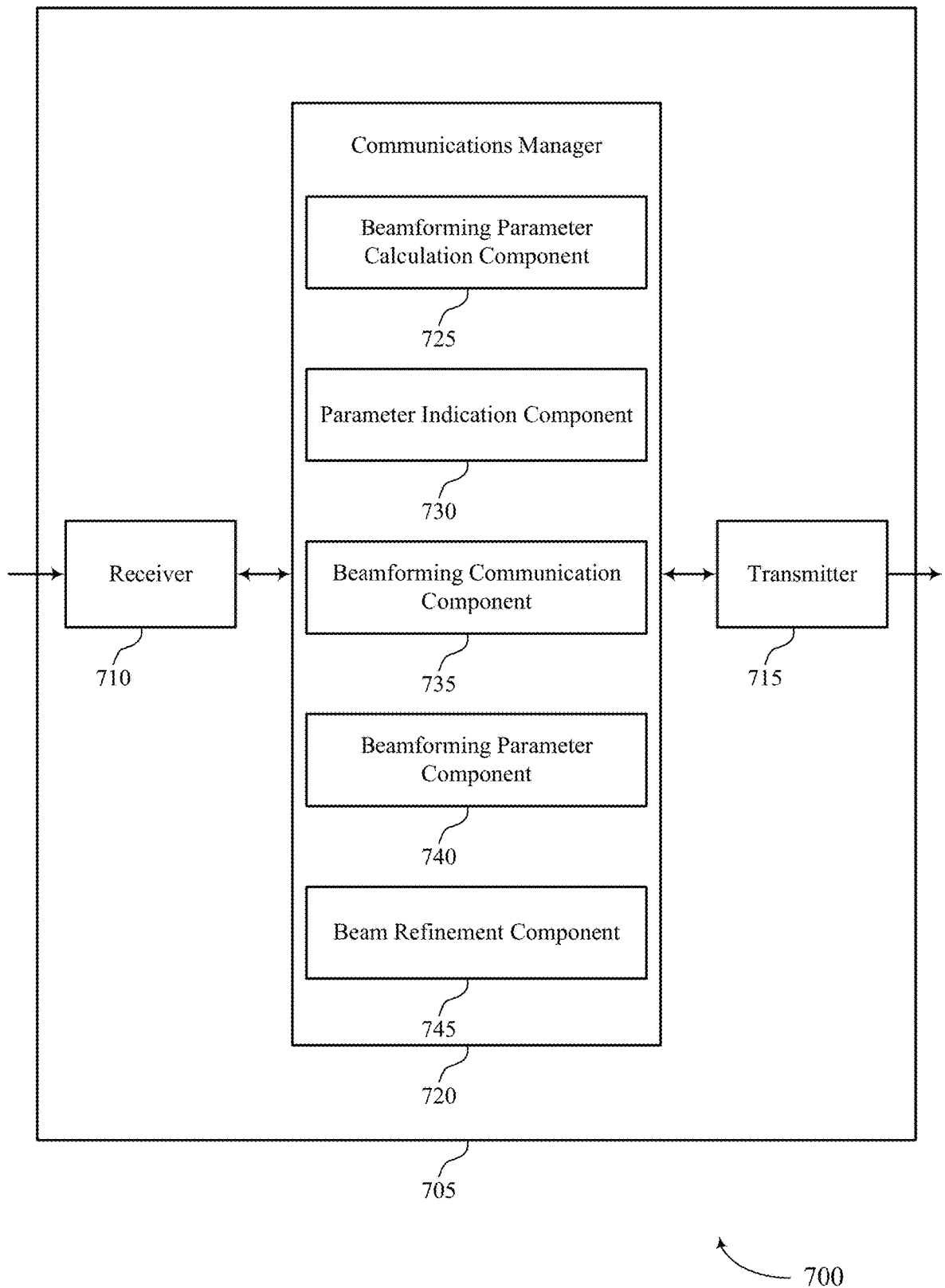

FIG. 7 shows a block diagram 700 of a device 705 that supports proactive communication of hybrid beamforming parameters between devices in accordance with aspects of the present disclosure. The device 705 may be an example of aspects of a device 605, a UE, an IAB node, an IRS node, a relay node, a repeater, or a CPE, as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to proactive communication of hybrid beamforming parameters between devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to proactive communication of hybrid beamforming parameters between devices). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of proactive communication of hybrid beamforming parameters between devices as described herein. For example, the communications manager 720 may include a beamforming parameter calculation component 725, a parameter indication component 730, a beamforming communication component 735, a beamforming parameter component 740, a beam refinement component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The beamforming parameter calculation component 725 may be configured as or otherwise support a means for calculating hybrid beamforming parameters for communications with a second device based on an estimation of channel information associated with at least a portion of a communication link at the second device via a machine learning model, where inputs to the machine learning model include measured parameters based on measurements performed by the second device, by one or more other devices, or both. The parameter indication component 730 may be configured as or otherwise support a means for transmitting, to the second device, a message indicating the hybrid beamforming parameters, where the hybrid beamforming parameters include an input for a beam refinement process at the second device. The beamforming communication component 735 may be configured as or otherwise support a means for communicating with the second device using one or more beams based on the hybrid beamforming parameters and a result of the beam refinement process.

Additionally or alternatively, the communications manager 720 may support wireless communication at a second device in accordance with examples as disclosed herein. The beamforming parameter component 740 may be configured as or otherwise support a means for receiving, from a first device, a message indicating hybrid beamforming parameters for communications with a second device, where the hybrid beamforming parameters include an input for a beam refinement process at the second device. The beam refinement component 745 may be configured as or otherwise support a means for performing the beam refinement process based on the hybrid beamforming parameters, where a result of the beam refinement process indicates one or more beams from a set of multiple beams for the second device. The beamforming communication component 735 may be configured as or otherwise support a means for communicating with the first device using the one or more beams based on the beam refinement process.

Figure 8:
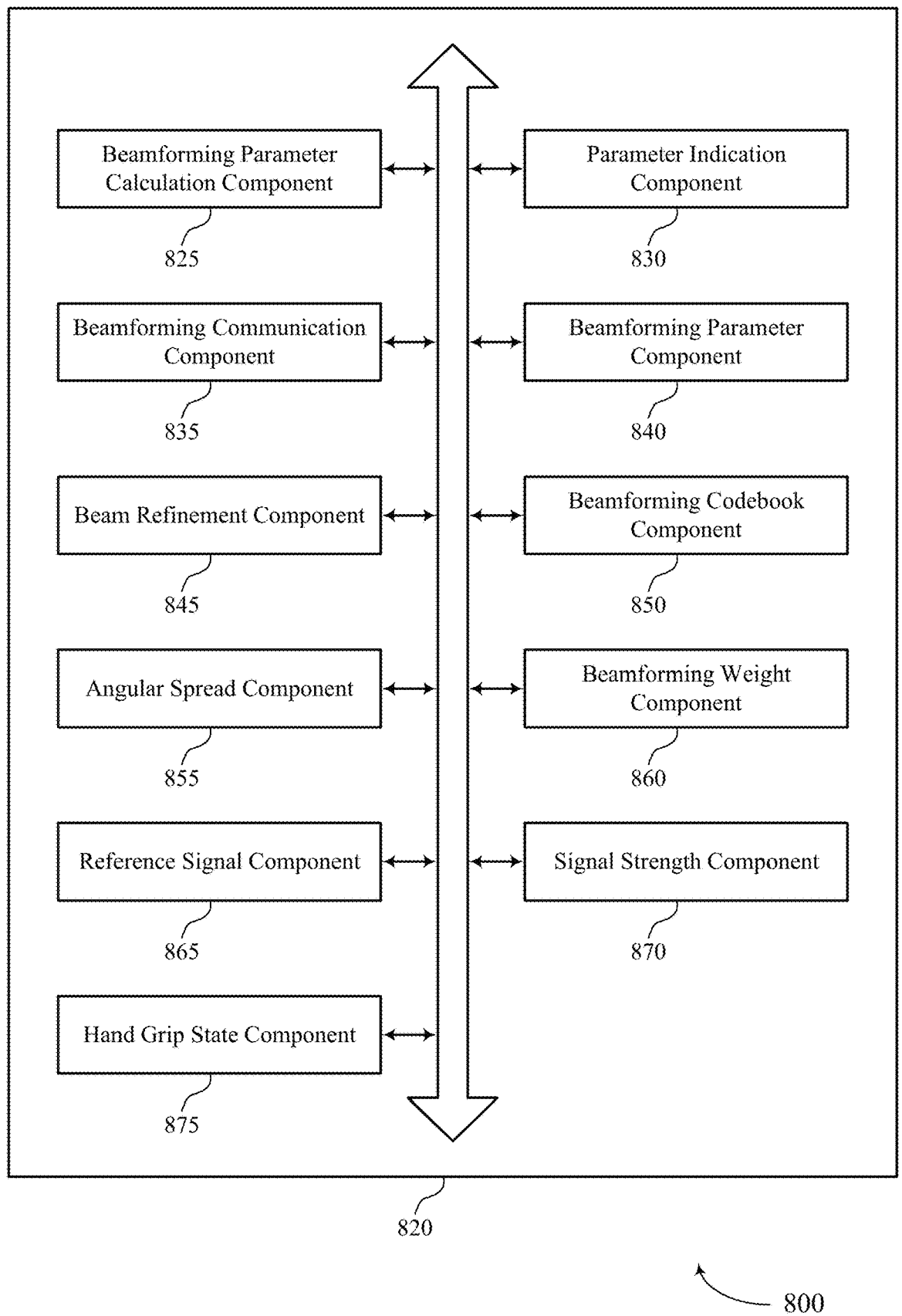
FIG. 8 shows a block diagram of a communications manager that supports proactive communication of hybrid beamforming parameters between devices in accordance with aspects of the present disclosure.

FIG. 8 shows a block diagram 800 of a communications manager 820 that supports proactive communication of hybrid beamforming parameters between devices in accordance with aspects of the present disclosure. The communications manager 820 may be an example of aspects of a communications manager 620, a communications manager 720, or both, as described herein. The communications manager 820, or various components thereof, may be an example of means for performing various aspects of proactive communication of hybrid beamforming parameters between devices as described herein. For example, the communications manager 820 may include a beamforming parameter calculation component 825, a parameter indication component 830, a beamforming communication component 835, a beamforming parameter component 840, a beam refinement component 845, a beamforming codebook component 850, an angular spread component 855, a beamforming weight component 860, a reference signal component 865, a signal strength component 870, a hand grip state component 875, or any combination thereof. Each of these components may communicate, directly or indirectly, with one another (e.g., via one or more buses).

The communications manager 820 may support wireless communication at a first device in accordance with examples as disclosed herein. The beamforming parameter calculation component 825 may be configured as or otherwise support a means for calculating hybrid beamforming parameters for communications with a second device based on an estimation of channel information associated with at least a portion of a communication link at the second device via a machine learning model, where inputs to the machine learning model include measured parameters based on measurements performed by the second device, by one or more other devices, or both. The parameter indication component 830 may be configured as or otherwise support a means for transmitting, to the second device, a message indicating the hybrid beamforming parameters, where the hybrid beamforming parameters include an input for a beam refinement process at the second device. The beamforming communication component 835 may be configured as or otherwise support a means for communicating with the second device using one or more beams based on the hybrid beamforming parameters and a result of the beam refinement process.

In some examples, to support transmitting the message indicating the hybrid beamforming parameters, the beamforming codebook component 850 may be configured as or otherwise support a means for transmitting the message indicating values used to generate the one or more beams in a beamforming codebook for use by the second device based on the estimation by the machine learning model, where the inputs to the machine learning model include a first set of hybrid beamforming parameters. In some examples, the values used to generate the one or more beams in the beamforming codebook include adjustments for scaling the beamforming codebook from a first carrier frequency to a second carrier frequency different than the first carrier frequency.

In some examples, the beamforming communication component 835 may be configured as or otherwise support a means for establishing communications with a third device using the first set of hybrid beamforming parameters. In some examples, the beamforming parameter calculation component 825 may be configured as or otherwise support a means for inputting the first set of hybrid beamforming parameters, position information associated with the third device, position information associated with the second device, or any combination thereof to the machine learning model based on establishing the communications with the third device. In some examples, the position information associated with the third device and the position information associated with the second device indicate that the third device is within a threshold distance of the second device.

In some examples, to support transmitting the message indicating the hybrid beamforming parameters, the angular spread component 855 may be configured as or otherwise support a means for transmitting the message indicating an estimated angular spread associated with a cluster capturing a channel matrix for the communication link between the first device and the second device based on the estimation by the machine learning model, where the inputs to the machine learning model include a set of multiple signal strength measurements.

In some examples, the reference signal component 865 may be configured as or otherwise support a means for transmitting a set of multiple reference signals to the second device, each reference signal of the set of multiple reference signals transmitted using a respective beam of a set of multiple beams, where the set of multiple beams are steered toward spatially adjacent directions. In some examples, the signal strength component 870 may be configured as or otherwise support a means for receiving, from the second device, the set of multiple signal strength measurements, each signal strength measurement of the set of multiple signal strength measurements associated with a respective reference signal of the set of multiple reference signals.

In some examples, to support calculating the hybrid beamforming parameters, the angular spread component 855 may be configured as or otherwise support a means for calculating the estimated angular spread associated with the cluster capturing the channel matrix based on a quantity of one or more signal strength measurements of the set of multiple signal strength measurements that exceed a threshold signal strength.

In some examples, to support transmitting the message indicating the hybrid beamforming parameters, the beamforming weight component 860 may be configured as or otherwise support a means for transmitting the message indicating a set of one or more initial hybrid beamforming weights associated with the one or more beams based on the estimation by the machine learning model, where the inputs to the machine learning model include a value indicative of a hand grip state associated with the second device.

In some examples, the hand grip state component 875 may be configured as or otherwise support a means for receiving, from the second device, an indication of the hand grip state associated with a state of a hand or fingers that hold the second device relative to one or more antenna elements of the second device, where calculating the hybrid beamforming parameters is based on receiving the indication of the hand grip state.

In some examples, the indication of the hand grip state includes an index of the hand grip state from a set of multiple configured hand grip states. In some examples, the hand grip state corresponds to one or more hand grip parameters, the one or more hand grip parameters including a reflective property of a hand, a grip arrangement of the hand, a quantity of fingers of the hand that occlude one or more antenna elements of the second device, an application executed by the second device, or any combination thereof.

In some examples, to support calculating the hybrid beamforming parameters, the beamforming parameter calculation component 825 may be configured as or otherwise support a means for calculating the hybrid beamforming parameters based on a machine learning algorithm, a prediction algorithm, or both associated with the machine learning model. In some examples, each of the first device and the second device is one of a base station, a UE, an IAB node, an IRS node, a relay node, a repeater, or a CPE.

Additionally or alternatively, the communications manager 820 may support wireless communication at a second device in accordance with examples as disclosed herein. The beamforming parameter component 840 may be configured as or otherwise support a means for receiving, from a first device, a message indicating hybrid beamforming parameters for communications with a second device, where the hybrid beamforming parameters include an input for a beam refinement process at the second device. The beam refinement component 845 may be configured as or otherwise support a means for performing the beam refinement process based on the hybrid beamforming parameters, where a result of the beam refinement process indicates one or more beams from a set of multiple beams for the second device. In some examples, the beamforming communication component 835 may be configured as or otherwise support a means for communicating with the first device using the one or more beams based on the beam refinement process.

In some examples, to support receiving the message indicating the hybrid beamforming parameters, the beamforming codebook component 850 may be configured as or otherwise support a means for receiving the message indicating values used to generate the one or more beams in a beamforming codebook for use by the second device. In some examples, the values used to generate the one or more beams in the beamforming codebook include adjustments for scaling the beamforming codebook from a first carrier frequency to a second carrier frequency different than the first carrier frequency.

In some examples, to support receiving the message indicating the hybrid beamforming parameters, the angular spread component 855 may be configured as or otherwise support a means for receiving the message indicating an estimated angular spread associated with a cluster capturing a channel matrix for a communication link between the first device and the second device.

In some examples, the reference signal component 865 may be configured as or otherwise support a means for receiving a set of multiple reference signals from the first device, each reference signal of the set of multiple reference signals received using a respective beam of a set of multiple beams, where the set of multiple beams are steered toward spatially adjacent directions. In some examples, the signal strength component 870 may be configured as or otherwise support a means for transmitting, to the first device, a set of multiple signal strength measurements, each signal strength measurement of the set of multiple signal strength measurements associated with a respective reference signal of the set of multiple reference signals, where the estimated angular spread is based on the set of multiple signal strength measurements.

In some examples, to support receiving the message indicating the hybrid beamforming parameters, the beamforming weight component 860 may be configured as or otherwise support a means for receiving the message indicating a set of one or more initial hybrid beamforming weights associated with the one or more beams.

In some examples, the hand grip state component 875 may be configured as or otherwise support a means for transmitting, to the first device, an indication of a hand grip state associated with a state of a hand or fingers that hold the second device relative to one or more antenna elements of the second device, where the set of one or more initial hybrid beamforming weights is based on the indication of the hand grip state.

In some examples, the indication of the hand grip state includes an index of the hand grip state from a set of multiple configured hand grip states. In some examples, the hand grip state corresponds to one or more hand grip parameters, the one or more hand grip parameters including a reflective property of a hand, a grip arrangement of the hand, a quantity of fingers of the hand that occlude one or more antenna elements of the second device, an application executed by the second device, or any combination thereof. In some examples, each of the first device and the second device is one of a base station, a UE, an IAB node, an IRS node, a relay node, a repeater, or a CPE.

Figure 9:
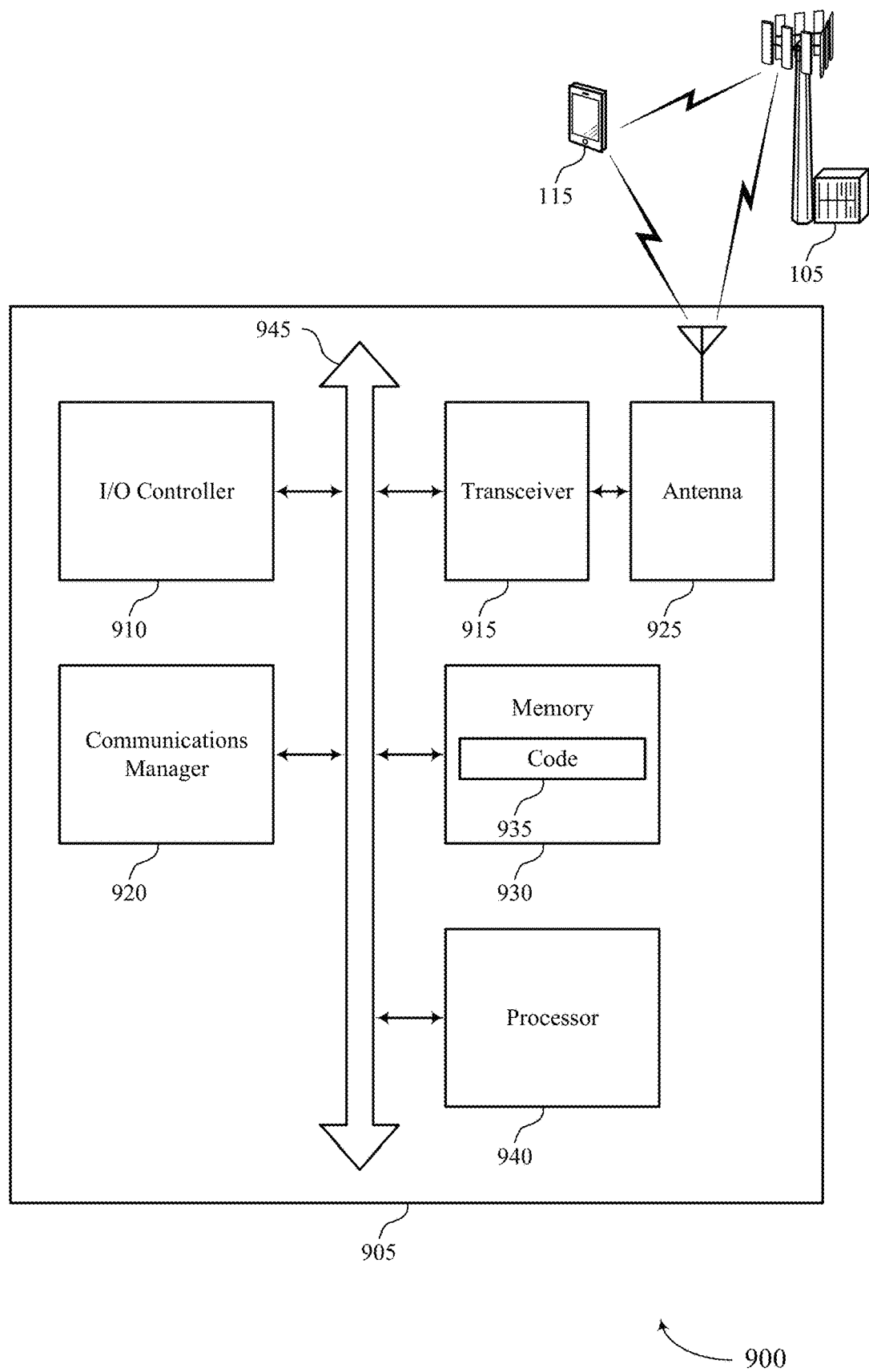
FIG. 9 shows a diagram of a system including a base station that supports proactive communication of hybrid beamforming parameters between devices in accordance with aspects of the present disclosure.

FIG. 9 shows a diagram of a system 900 including a device 905 that supports proactive communication of hybrid beamforming parameters between devices in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting proactive communication of hybrid beamforming parameters between devices). For example, the device 905 or a component of the device 905 may include a processor 940 and memory 930 coupled with or to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for calculating hybrid beamforming parameters for communications with a second device based on an estimation of channel information associated with at least a portion of a communication link at the second device via a machine learning model, where inputs to the machine learning model include measured parameters based on measurements performed by the second device, by one or more other devices, or both. The communications manager 920 may be configured as or otherwise support a means for transmitting, to the second device, a message indicating the hybrid beamforming parameters, where the hybrid beamforming parameters include an input for a beam refinement process at the second device. The communications manager 920 may be configured as or otherwise support a means for communicating with the second device using one or more beams based on the hybrid beamforming parameters and a result of the beam refinement process.

Additionally or alternatively, the communications manager 920 may support wireless communication at a second device in accordance with examples as disclosed herein. For example, the communications manager 920 may be configured as or otherwise support a means for receiving, from a first device, a message indicating hybrid beamforming parameters for communications with a second device, where the hybrid beamforming parameters include an input for a beam refinement process at the second device. The communications manager 920 may be configured as or otherwise support a means for performing the beam refinement process based on the hybrid beamforming parameters, where a result of the beam refinement process indicates one or more beams from a set of multiple beams for the second device. The communications manager 920 may be configured as or otherwise support a means for communicating with the first device using the one or more beams based on the beam refinement process.

By including or configuring the communications manager 920 in accordance with examples as described herein, the device 905 may support techniques for improved communication reliability, reduced latency, improved user experience related to reduced processing, reduced power consumption, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of proactive communication of hybrid beamforming parameters between devices as described herein, or the processor 940 and the memory 930 may be otherwise configured to perform or support such operations.

Figure 10:
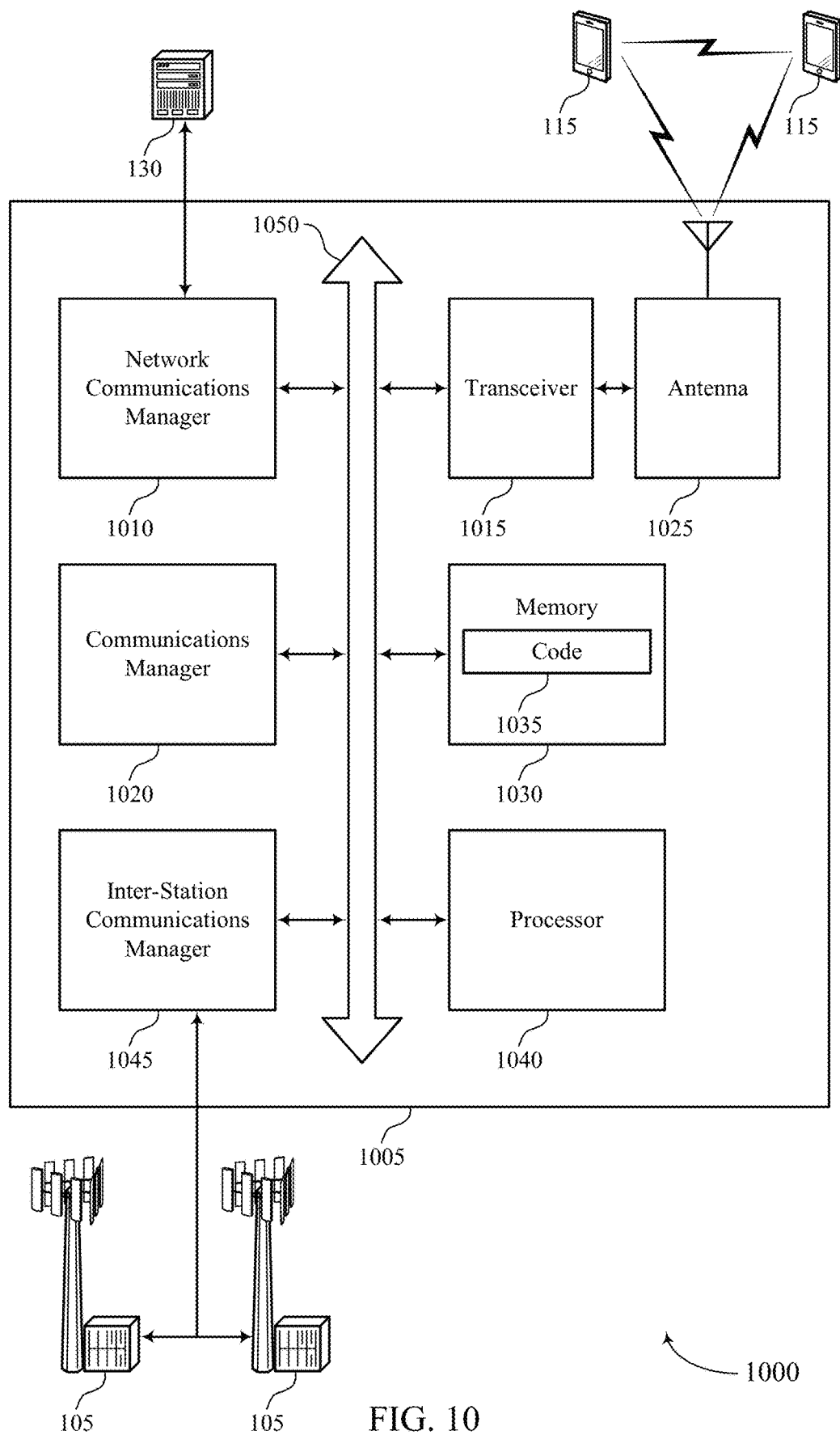
FIG. 10 shows a diagram of a system including a UE that supports proactive communication of hybrid beamforming parameters between devices in accordance with aspects of the present disclosure.

FIG. 10 shows a diagram of a system 1000 including a device 1005 that supports proactive communication of hybrid beamforming parameters between devices in accordance with aspects of the present disclosure. The device 1005 may be an example of or include the components of a device 605, a device 705, a base station 105, or some other network node as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, a network communications manager 1010, a transceiver 1015, an antenna 1025, a memory 1030, code 1035, a processor 1040, and an inter-station communications manager 1045. These components may be in electronic communication or otherwise coupled (e.g., operatively, communicatively, functionally, electronically, electrically) via one or more buses (e.g., a bus 1050).

The network communications manager 1010 may manage communications with a core network 130 (e.g., via one or more wired backhaul links). For example, the network communications manager 1010 may manage the transfer of data communications for client devices, such as one or more UEs 115.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 615, a transmitter 715, a receiver 610, a receiver 710, or any combination thereof or component thereof, as described herein.

The memory 1030 may include RAM and ROM. The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting proactive communication of hybrid beamforming parameters between devices). For example, the device 1005 or a component of the device 1005 may include a processor 1040 and memory 1030 coupled with or to the processor 1040, the processor 1040 and memory 1030 configured to perform various functions described herein.

The inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communications network technology to provide communication between base stations 105.

The communications manager 1020 may support wireless communication at a first device in accordance with examples as disclosed herein. For example, the communications manager 1020 may be configured as or otherwise support a means for calculating hybrid beamforming parameters for communications with a second device based on an estimation of channel information associated with at least a portion of a communication link at the second device via a machine learning model, where inputs to the machine learning model include measured parameters based on measurements performed by the second device, by one or more other devices, or both. The communications manager 1020 may be configured as or otherwise support a means for transmitting, to the second device, a message indicating the hybrid beamforming parameters, where the hybrid beamforming parameters include an input for a beam refinement process at the second device. The communications manager 1020 may be configured as or otherwise support a means for communicating with the second device using one or more beams based on the hybrid beamforming parameters and a result of the beam refinement process.

Additionally or alternatively, the communications manager 1020 may support wireless communication at a second device in accordance with examples as disclosed herein. For example, the communications manager 1020 may be configured as or otherwise support a means for receiving, from a first device, a message indicating hybrid beamforming parameters for communications with a second device, where the hybrid beamforming parameters include an input for a beam refinement process at the second device. The communications manager 1020 may be configured as or otherwise support a means for performing the beam refinement process based on the hybrid beamforming parameters, where a result of the beam refinement process indicates one or more beams from a set of multiple beams for the second device. The communications manager 1020 may be configured as or otherwise support a means for communicating with the first device using the one or more beams based on the beam refinement process.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of proactive communication of hybrid beamforming parameters between devices as described herein, or the processor 1040 and the memory 1030 may be otherwise configured to perform or support such operations.

Figure 11:
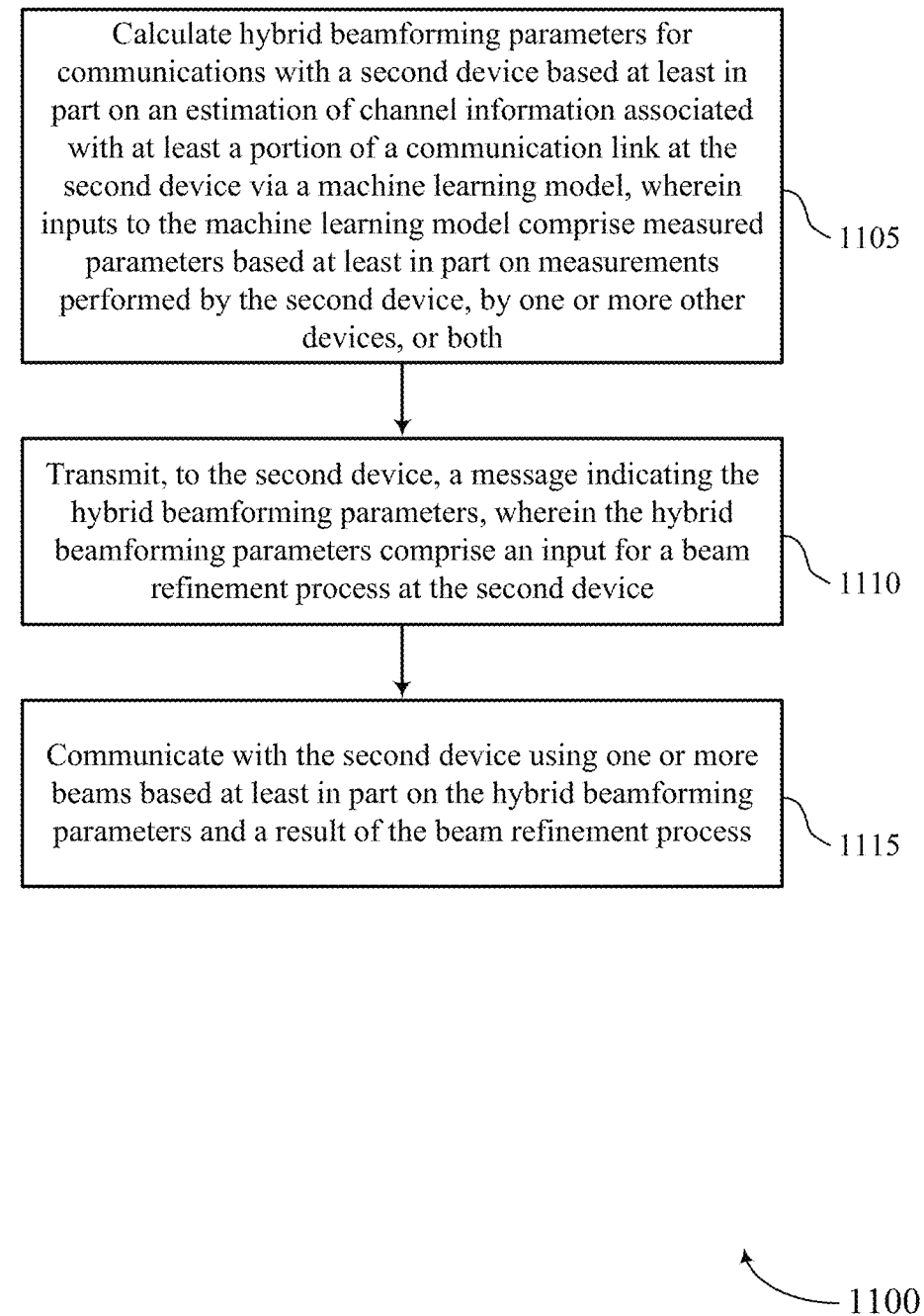
FIGS. 11 through 16 show flowcharts illustrating methods that support proactive communication of hybrid beamforming parameters between devices in accordance with aspects of the present disclosure.

FIG. 11 shows a flowchart illustrating a method 1100 that supports proactive communication of hybrid beamforming parameters between devices in accordance with aspects of the present disclosure. The operations of the method 1100 may be implemented by a first device (e.g., UE, a base station, an IAB node, an IRS node, a relay node, or a CPE) or its components as described herein. For example, the operations of the method 1100 may be performed by a device, as described with reference to FIGS. 1 through 10. In some examples, a first device may execute a set of instructions to control the functional elements of the device to perform the described functions. Additionally or alternatively, the first device may perform aspects of the described functions using special-purpose hardware.

At 1105, the method may include calculating hybrid beamforming parameters for communications with a second device based on an estimation of channel information associated with at least a portion of a communication link at the second device via a machine learning model, where inputs to the machine learning model may include measured parameters based on measurements performed by the second device, by one or more other devices, or both. The operations of 1105 may be performed in accordance with examples as disclosed herein. In some examples, aspects of the operations of 1105 may be performed by a beamforming parameter calculation component 825 as described with reference to FIG. 8.

At 1110, the method may include transmitting, to the second device, a message indicating the hybrid beamforming parameters, where the hybrid beamforming parameters include an input for a beam refinement process at the second device. The operations of 1110 may be performed in accordance with examples as disclosed herein. In some examples, aspects of the operations of 1110 may be performed by a parameter indication component 830 as described with reference to FIG. 8.

At 1115, the method may include communicating with the second device using one or more beams based on the hybrid beamforming parameters and a result of the beam refinement process. The operations of 1115 may be performed in accordance with examples as disclosed herein. In some examples, aspects of the operations of 1115 may be performed by a beamforming communication component 835 as described with reference to FIG. 8.

Figure 12:
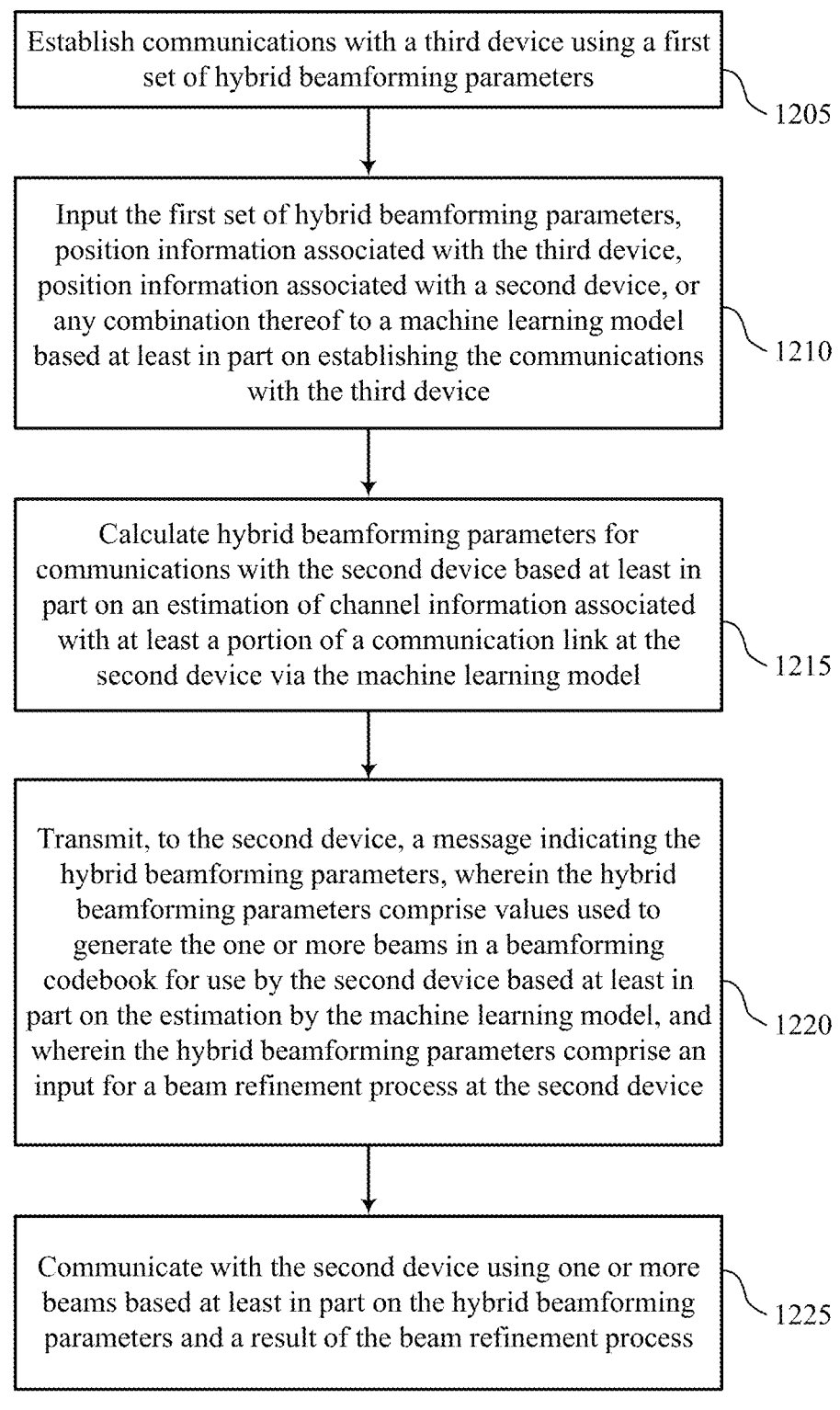

FIG. 12 shows a flowchart illustrating a method 1200 that supports proactive communication of hybrid beamforming parameters between devices in accordance with aspects of the present disclosure. The operations of the method 1200 may be implemented by a first device (e.g., UE, a base station, an IAB node, an IRS node, a relay node, or a CPE) or its components as described herein. For example, the operations of the method 1200 may be performed by a device, as described with reference to FIGS. 1 through 10. In some examples, a first device may execute a set of instructions to control the functional elements of the device to perform the described functions. Additionally or alternatively, the first device may perform aspects of the described functions using special-purpose hardware.

At 1205, the method may include establishing communications with a third device using a first set of hybrid beamforming parameters. The operations of 1205 may be performed in accordance with examples as disclosed herein. In some examples, aspects of the operations of 1205 may be performed by a beamforming communication component 835 as described with reference to FIG. 8.

At 1210, the method may include inputting the first set of hybrid beamforming parameters, position information associated with the third device, position information associated with a second device, or any combination thereof to a machine learning model based on establishing the communications with the third device. The operations of 1210 may be performed in accordance with examples as disclosed herein. In some examples, aspects of the operations of 1210 may be performed by a beamforming parameter calculation component 825 as described with reference to FIG. 8.

At 1215, the method may include calculating hybrid beamforming parameters for communications with the second device based on an estimation of channel information associated with at least a portion of a communication link at the second device via the machine learning model. The operations of 1215 may be performed in accordance with examples as disclosed herein. In some examples, aspects of the operations of 1215 may be performed by a beamforming parameter calculation component 825 as described with reference to FIG. 8.

At 1220, the method may include transmitting, to the second device, a message indicating the hybrid beamforming parameters, where the hybrid beamforming parameters include values used to generate the one or more beams in a beamforming codebook for use by the second device based on the estimation by the machine learning model, and where the hybrid beamforming parameters include an input for a beam refinement process at the second device. The operations of 1220 may be performed in accordance with examples as disclosed herein. In some examples, aspects of the operations of 1220 may be performed by a parameter indication component 830 as described with reference to FIG. 8.

At 1225, the method may include communicating with the second device using one or more beams based on the hybrid beamforming parameters and a result of the beam refinement process. The operations of 1225 may be performed in accordance with examples as disclosed herein. In some examples, aspects of the operations of 1225 may be performed by a beamforming communication component 835 as described with reference to FIG. 8.

Figure 13:
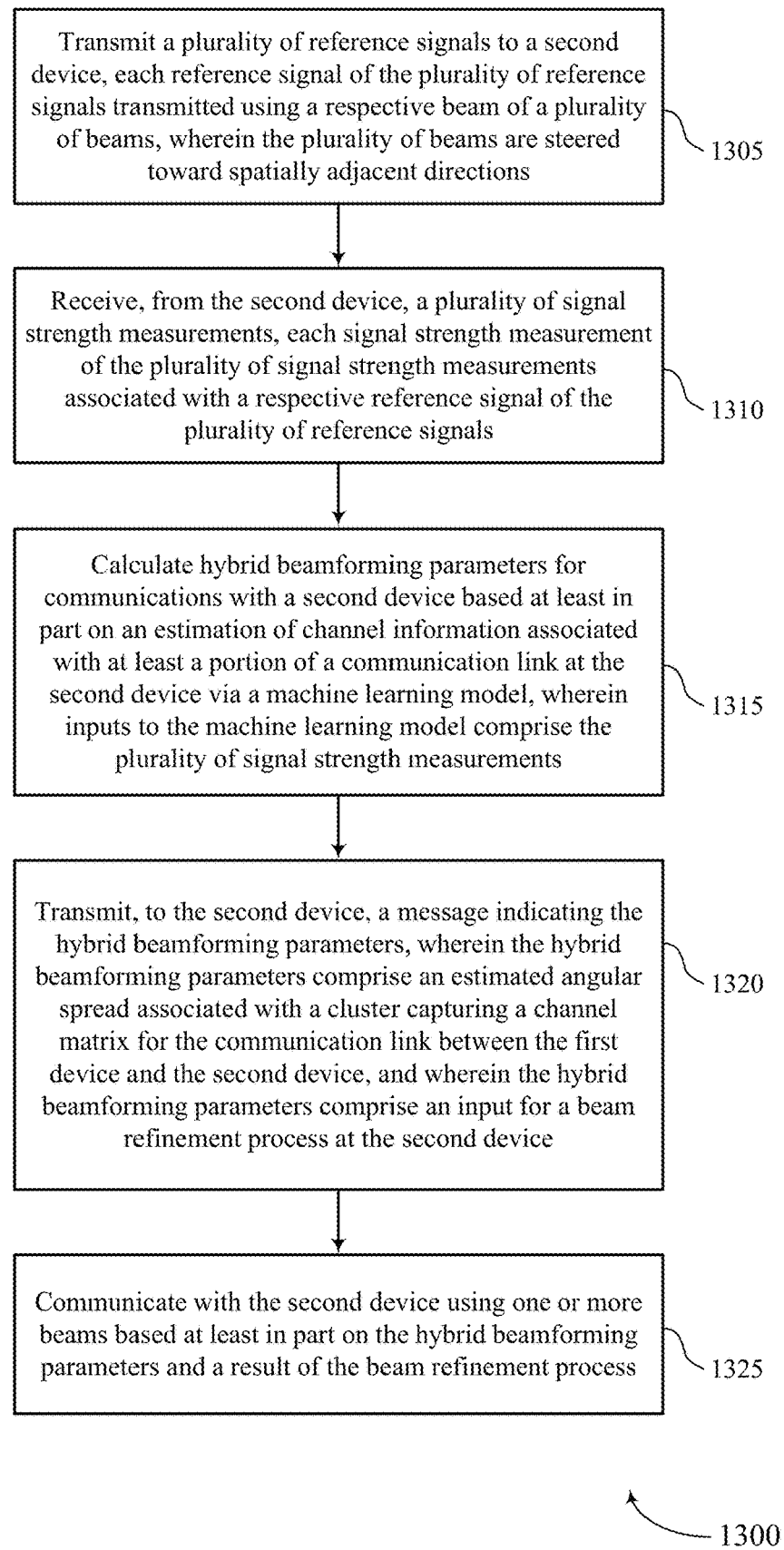

FIG. 13 shows a flowchart illustrating a method 1300 that supports proactive communication of hybrid beamforming parameters between devices in accordance with aspects of the present disclosure. The operations of the method 1300 may be implemented by a first device (e.g., UE, a base station, an IAB node, an IRS node, a relay node, or a CPE) or its components as described herein. For example, the operations of the method 1300 may be performed by a device, as described with reference to FIGS. 1 through 10. In some examples, a first device may execute a set of instructions to control the functional elements of the device to perform the described functions. Additionally or alternatively, the first device may perform aspects of the described functions using special-purpose hardware.

At 1305, the method may include transmitting a set of multiple reference signals to a second device, each reference signal of the set of multiple reference signals transmitted using a respective beam of a set of multiple beams, where the set of multiple beams may be steered toward spatially adjacent directions. The operations of 1305 may be performed in accordance with examples as disclosed herein. In some examples, aspects of the operations of 1305 may be performed by a reference signal component 865 as described with reference to FIG. 8.

At 1310, the method may include receiving, from the second device, a set of multiple signal strength measurements, each signal strength measurement of the set of multiple signal strength measurements associated with a respective reference signal of the set of multiple reference signals. The operations of 1310 may be performed in accordance with examples as disclosed herein. In some examples, aspects of the operations of 1310 may be performed by a signal strength component 870 as described with reference to FIG. 8.

At 1315, the method may include calculating hybrid beamforming parameters for communications with a second device based on an estimation of channel information associated with at least a portion of a communication link at the second device via a machine learning model, where inputs to the machine learning model include the set of multiple signal strength measurements. The operations of 1315 may be performed in accordance with examples as disclosed herein. In some examples, aspects of the operations of 1315 may be performed by a beamforming parameter calculation component 825 as described with reference to FIG. 8.

At 1320, the method may include transmitting, to the second device, a message indicating the hybrid beamforming parameters, where the hybrid beamforming parameters include an estimated angular spread associated with a cluster capturing a channel matrix for aa communication link between the first device and the second device, and where the hybrid beamforming parameters include an input for a beam refinement process at the second device. The operations of 1320 may be performed in accordance with examples as disclosed herein. In some examples, aspects of the operations of 1320 may be performed by a parameter indication component 830 as described with reference to FIG. 8.

At 1325, the method may include communicating with the second device using one or more beams based on the hybrid beamforming parameters and a result of the beam refinement process. The operations of 1325 may be performed in accordance with examples as disclosed herein. In some examples, aspects of the operations of 1325 may be performed by a beamforming communication component 835 as described with reference to FIG. 8.

Figure 14:
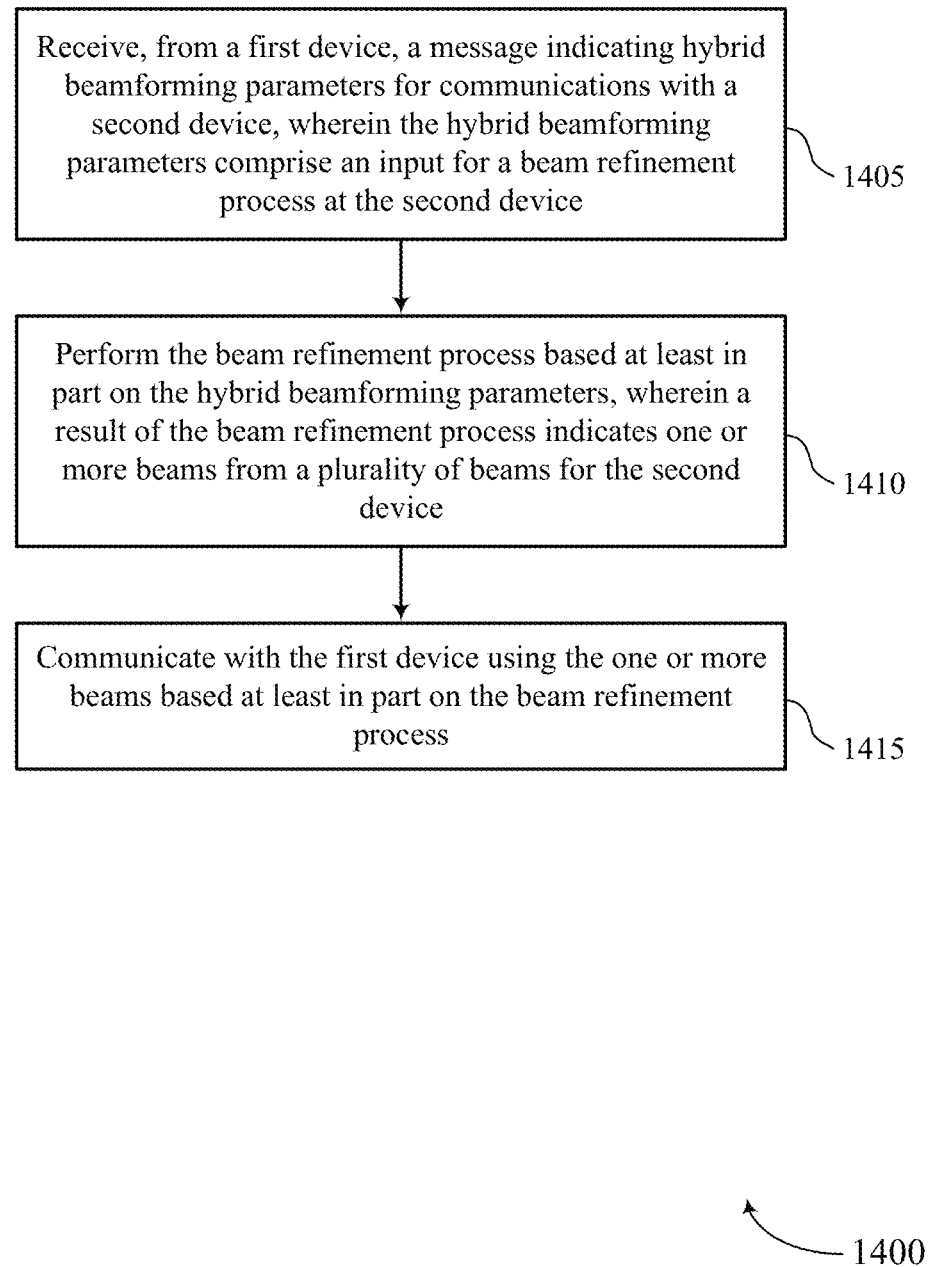

FIG. 14 shows a flowchart illustrating a method 1400 that supports proactive communication of hybrid beamforming parameters between devices in accordance with aspects of the present disclosure. The operations of the method 1400 may be implemented by a second device (e.g., UE, a base station, an IAB node, an IRS node, a relay node, or a CPE) or its components as described herein. For example, the operations of the method 1300 may be performed by a device, as described with reference to FIGS. 1 through 10. In some examples, a second device may execute a set of instructions to control the functional elements of the device to perform the described functions. Additionally or alternatively, the second device may perform aspects of the described functions using special-purpose hardware.

At 1405, the method may include receiving, from a first device, a message indicating hybrid beamforming parameters for communications with a second device, where the hybrid beamforming parameters include an input for a beam refinement process at the second device. The operations of 1405 may be performed in accordance with examples as disclosed herein. In some examples, aspects of the operations of 1405 may be performed by a beamforming parameter component 840 as described with reference to FIG. 8.

At 1410, the method may include performing the beam refinement process based on the hybrid beamforming parameters, where a result of the beam refinement process indicates one or more beams from a set of multiple beams for the second device. The operations of 1410 may be performed in accordance with examples as disclosed herein. In some examples, aspects of the operations of 1410 may be performed by a beam refinement component 845 as described with reference to FIG. 8.

At 1415, the method may include communicating with the first device using the one or more beams based on the beam refinement process. The operations of 1415 may be performed in accordance with examples as disclosed herein. In some examples, aspects of the operations of 1415 may be performed by a beamforming communication component 835 as described with reference to FIG. 8.

Figure 15:
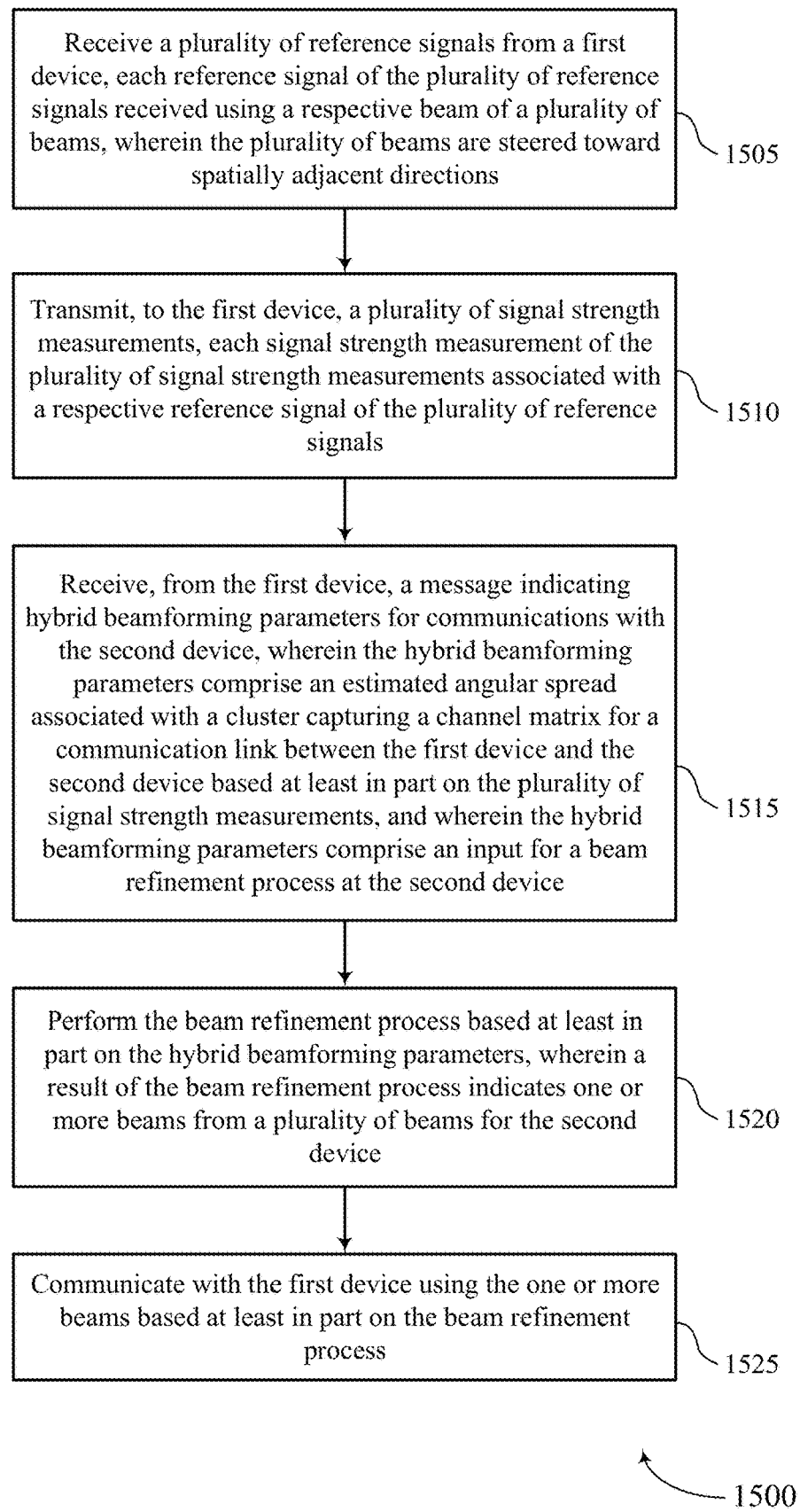

FIG. 15 shows a flowchart illustrating a method 1500 that supports proactive communication of hybrid beamforming parameters between devices in accordance with aspects of the present disclosure. The operations of the method 1500 may be implemented by a second device (e.g., UE, a base station, an IAB node, an IRS node, a relay node, or a CPE) or its components as described herein. For example, the operations of the method 1300 may be performed by a device, as described with reference to FIGS. 1 through 10. In some examples, a second device may execute a set of instructions to control the functional elements of the device to perform the described functions. Additionally or alternatively, the second device may perform aspects of the described functions using special-purpose hardware.

At 1505, the method may include receiving a set of multiple reference signals from a first device, each reference signal of the set of multiple reference signals received using a respective beam of a set of multiple beams, where the set of multiple beams may be steered toward spatially adjacent directions. The operations of 1505 may be performed in accordance with examples as disclosed herein. In some examples, aspects of the operations of 1505 may be performed by a reference signal component 865 as described with reference to FIG. 8.

At 1510, the method may include transmitting, to the first device, a set of multiple signal strength measurements, each signal strength measurement of the set of multiple signal strength measurements associated with a respective reference signal of the set of multiple reference signals. The operations of 1510 may be performed in accordance with examples as disclosed herein. In some examples, aspects of the operations of 1510 may be performed by a signal strength component 870 as described with reference to FIG. 8.

At 1515, the method may include receiving, from the first device, a message indicating hybrid beamforming parameters for communications with the second device, where the hybrid beamforming parameters include an estimated angular spread associated with a cluster capturing a channel matrix for a communication link between the first device and the second device based on the set of multiple signal strength measurements, and where the hybrid beamforming parameters include an input for a beam refinement process at the second device. The operations of 1515 may be performed in accordance with examples as disclosed herein. In some examples, aspects of the operations of 1515 may be performed by a beamforming parameter component 840 as described with reference to FIG. 8.

At 1520, the method may include performing the beam refinement process based on the hybrid beamforming parameters, where a result of the beam refinement process indicates one or more beams from a set of multiple beams for the second device. The operations of 1520 may be performed in accordance with examples as disclosed herein. In some examples, aspects of the operations of 1520 may be performed by a beam refinement component 845 as described with reference to FIG. 8.

At 1525, the method may include communicating with the first device using the one or more beams based on the beam refinement process. The operations of 1525 may be performed in accordance with examples as disclosed herein. In some examples, aspects of the operations of 1525 may be performed by a beamforming communication component 835 as described with reference to FIG. 8.

Figure 16:
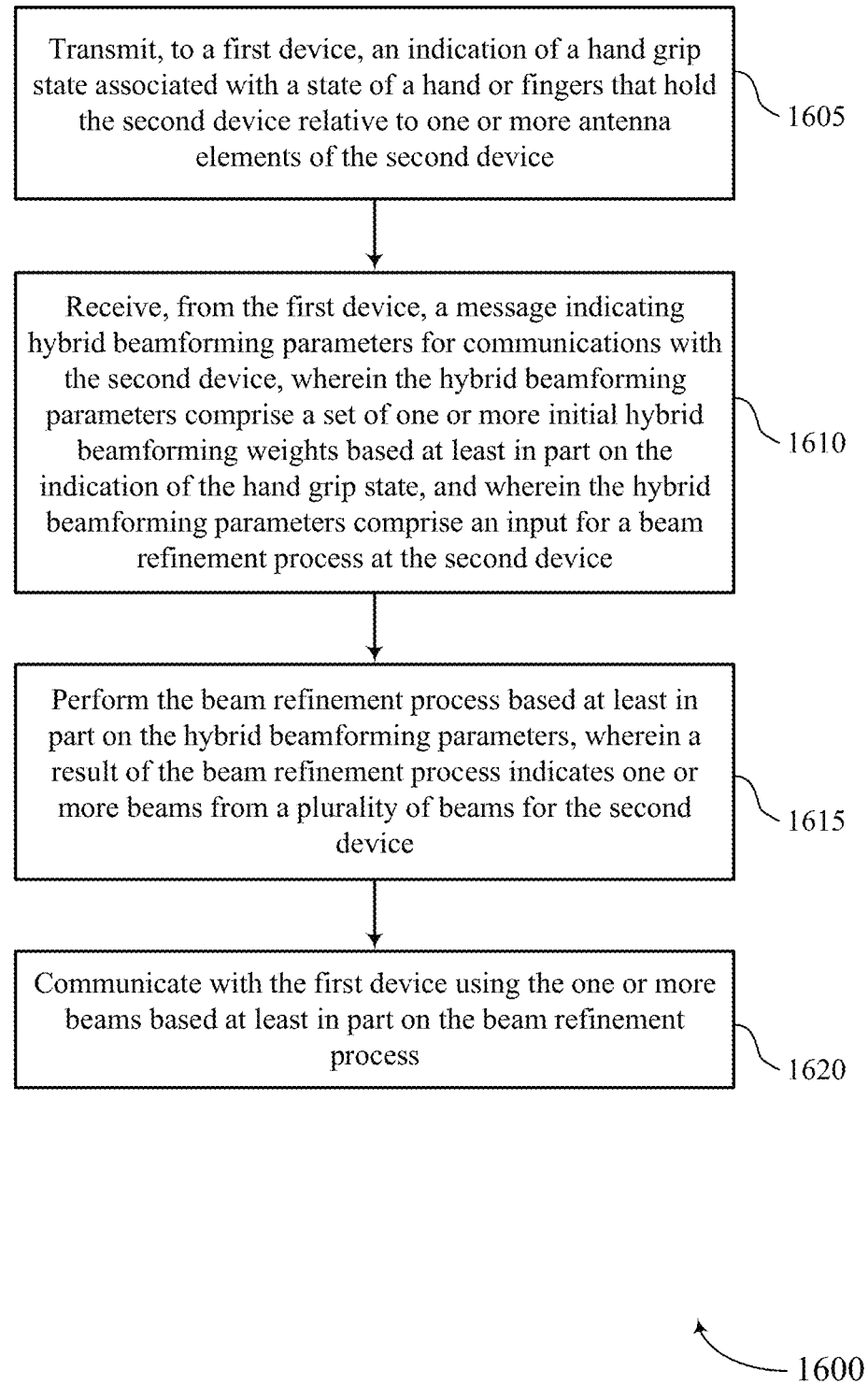

FIG. 16 shows a flowchart illustrating a method 1600 that supports proactive communication of hybrid beamforming parameters between devices in accordance with aspects of the present disclosure. The operations of the method 1600 may be implemented by a second device (e.g., UE, a base station, an IAB node, an IRS node, a relay node, or a CPE) or its components as described herein. For example, the operations of the method 1300 may be performed by a device, as described with reference to FIGS. 1 through 10. In some examples, a second device may execute a set of instructions to control the functional elements of the device to perform the described functions. Additionally or alternatively, the second device may perform aspects of the described functions using special-purpose hardware.

At 1605, the method may include transmitting, to a first device, an indication of a hand grip state associated with a state of a hand or fingers that hold the second device relative to one or more antenna elements of the second device. The operations of 1605 may be performed in accordance with examples as disclosed herein. In some examples, aspects of the operations of 1605 may be performed by a hand grip state component 875 as described with reference to FIG. 8.

At 1610, the method may include receiving, from a first device, a message indicating hybrid beamforming parameters for communications with the second device, where the hybrid beamforming parameters include a set of one or more initial hybrid beamforming weights based on the indication of the hand grip state, and where the hybrid beamforming parameters include an input for a beam refinement process at the second device. The operations of 1610 may be performed in accordance with examples as disclosed herein. In some examples, aspects of the operations of 1610 may be performed by a beamforming parameter component 840 as described with reference to FIG. 8.

At 1615, the method may include performing the beam refinement process based on the hybrid beamforming parameters, where a result of the beam refinement process indicates one or more beams from a set of multiple beams for the second device. The operations of 1615 may be performed in accordance with examples as disclosed herein. In some examples, aspects of the operations of 1615 may be performed by a beam refinement component 845 as described with reference to FIG. 8.

At 1620, the method may include communicating with the first device using the one or more beams based on the beam refinement process. The operations of 1620 may be performed in accordance with examples as disclosed herein. In some examples, aspects of the operations of 1620 may be performed by a beamforming communication component 835 as described with reference to FIG. 8.

The following provides an overview of aspects of the present disclosure:

Aspect 1: A method for wireless communication at a first device, comprising: calculating hybrid beamforming parameters for communications with a second device based at least in part on an estimation of channel information associated with at least a portion of a communication link at the second device via a machine learning model, wherein inputs to the machine learning model comprise measured parameters based at least in part on measurements performed by the second device, by one or more other devices, or both; transmitting, to the second device, a message indicating the hybrid beamforming parameters, wherein the hybrid beamforming parameters comprise an input for a beam refinement process at the second device; and communicating with the second device using one or more beams based at least in part on the hybrid beamforming parameters and a result of the beam refinement process.

Aspect 2: The method of aspect 1, wherein transmitting the message indicating the hybrid beamforming parameters comprises: transmitting the message indicating values used to generate the one or more beams in a beamforming codebook for use by the second device based at least in part on the estimation by the machine learning model, wherein the inputs to the machine learning model comprise a first set of hybrid beamforming parameters.

Aspect 3: The method of aspect 2, wherein the values used to generate the one or more beams in the beamforming codebook comprise adjustments for scaling the beamforming codebook from a first carrier frequency to a second carrier frequency different than the first carrier frequency.

Aspect 4: The method of aspect 1, further comprising: establishing communications with a third device using the first set of hybrid beamforming parameters; and utilizing the first set of hybrid beamforming parameters, position information associated with the third device, position information associated with the second device, or any combination thereof in the machine learning model based at least in part on establishing the communications with the third device.

Aspect 5: The method of aspect 4, wherein the position information associated with the third device and the position information associated with the second device indicate that the third device is within a threshold distance of the second device.

Aspect 6: The method of aspect 1, wherein transmitting the message indicating the hybrid beamforming parameters comprises: transmitting the message indicating an estimated angular spread associated with a cluster capturing a channel matrix for the communication link between the first device and the second device based at least in part on the estimation by the machine learning model, wherein the inputs to the machine learning model comprise a plurality of signal strength measurements.

Aspect 7: The method of aspect 6, further comprising: transmitting a plurality of reference signals to the second device, each reference signal of the plurality of reference signals transmitted using a respective beam of a plurality of beams, wherein the plurality of beams are steered toward spatially adjacent directions; and receiving, from the second device, the plurality of signal strength measurements, each signal strength measurement of the plurality of signal strength measurements associated with a respective reference signal of the plurality of reference signals.

Aspect 8: The method of aspect 7, wherein calculating the hybrid beamforming parameters comprises: calculating the estimated angular spread associated with the cluster capturing the channel matrix based at least in part on a quantity of one or more signal strength measurements of the plurality of signal strength measurements that exceed a threshold signal strength.

Aspect 9: The method of aspect 1, wherein transmitting the message indicating the hybrid beamforming parameters comprises: transmitting the message indicating a set of one or more initial hybrid beamforming weights associated with the one or more beams based at least in part on the estimation by the machine learning model, wherein the inputs to the machine learning model comprise a value indicative of a hand grip state associated with the second device.

Aspect 10: The method of aspect 9, further comprising: receiving, from the second device, an indication of the hand grip state associated with a state of a hand or fingers that hold the second device relative to one or more antenna elements of the second device, wherein calculating the hybrid beamforming parameters is based at least in part on receiving the indication of the hand grip state.

Aspect 11: The method of aspect 10, wherein the indication of the hand grip state comprises an index of the hand grip state from a plurality of configured hand grip states.

Aspect 12: The method of any of aspects 9 through 11, wherein the hand grip state corresponds to one or more hand grip parameters, the one or more hand grip parameters comprising a reflective property of a hand, a grip arrangement of the hand, a quantity of fingers of the hand that occlude one or more antenna elements of the second device, an application executed by the second device, or any combination thereof.

Aspect 13: The method of any of aspects 1 through 12, wherein calculating the hybrid beamforming parameters comprises: calculating the hybrid beamforming parameters based at least in part on a machine learning algorithm, a prediction algorithm, or both associated with the machine learning model.

Aspect 14: The method of any of aspects 1 through 13, wherein each of the first device and the second device is one of a base station, a UE, an IAB node, an IRS node, a relay node, a repeater, or a CPE.

Aspect 15: A method for wireless communication at a second device, comprising: receiving, from a first device, a message indicating hybrid beamforming parameters for communications with the second device, wherein the hybrid beamforming parameters comprise an input for a beam refinement process at the second device; performing the beam refinement process based at least in part on the hybrid beamforming parameters, wherein a result of the beam refinement process indicates one or more beams from a plurality of beams for the second device; and communicating with the first device using the one or more beams based at least in part on the beam refinement process.

Aspect 16: The method of aspect 15, wherein receiving the message indicating the hybrid beamforming parameters comprises: receiving the message indicating values used to generate the one or more beams in a beamforming codebook for use by the second device.

Aspect 17: The method of aspect 16, wherein the values used to generate the one or more beams in the beamforming codebook comprise adjustments for scaling the beamforming codebook from a first carrier frequency to a second carrier frequency different than the first carrier frequency.

Aspect 18: The method of aspect 15, wherein receiving the message indicating the hybrid beamforming parameters comprises: receiving the message indicating an estimated angular spread associated with a cluster capturing a channel matrix for a communication link between the first device and the second device.

Aspect 19: The method of aspect 18, further comprising: receiving a plurality of reference signals from the first device, each reference signal of the plurality of reference signals received using a respective beam of a plurality of beams, wherein the plurality of beams are steered toward spatially adjacent directions; and transmitting, to the first device, a plurality of signal strength measurements, each signal strength measurement of the plurality of signal strength measurements associated with a respective reference signal of the plurality of reference signals, wherein the estimated angular spread is based at least in part on the plurality of signal strength measurements.

Aspect 20: The method of aspect 15, wherein receiving the message indicating the hybrid beamforming parameters comprises: receiving the message indicating a set of one or more initial hybrid beamforming weights associated with the one or more beams.

Aspect 21: The method of aspect 20, further comprising: transmitting, to the first device, an indication of a hand grip state associated with a state of a hand or fingers that hold the second device relative to one or more antenna elements of the second device, wherein the set of one or more initial hybrid beamforming weights is based at least in part on the indication of the hand grip state.

Aspect 22: The method of aspect 21, wherein the indication of the hand grip state comprises an index of the hand grip state from a plurality of configured hand grip states.

Aspect 23: The method of any of aspects 21 through 22, wherein the hand grip state corresponds to one or more hand grip parameters, the one or more hand grip parameters comprising a reflective property of a hand, a grip arrangement of the hand, a quantity of fingers of the hand that occlude one or more antenna elements of the second device, an application executed by the second device, or any combination thereof.

Aspect 24: The method of any of aspects 15 through 23, wherein each of the first device and the second device is one of a base station, a UE, an IAB node, an IRS node, a relay node, a repeater, or a CPE.

Aspect 25: An apparatus for wireless communication at a first device, comprising a processor; memory coupled with the processor; and instructions stored in the memory and executable by the processor to cause the apparatus to perform a method of any of aspects 1 through 14.

Aspect 26: An apparatus for wireless communication at a first device, comprising at least one means for performing a method of any of aspects 1 through 14.

Aspect 27: A non-transitory computer-readable medium storing code for wireless communication at a first device, the code comprising instructions executable by a processor to perform a method of any of aspects 1 through 14.

Aspect 28: An apparatus for wireless communication at a second device, comprising a processor; memory coupled with the processor; and instructions stored in the memory and executable by the processor to cause the apparatus to perform a method of any of aspects 15 through 24.

Aspect 29: An apparatus for wireless communication at a second device, comprising at least one means for performing a method of any of aspects 15 through 24.

Aspect 30: A non-transitory computer-readable medium storing code for wireless communication at a second device, the code comprising instructions executable by a processor to perform a method of any of aspects 15 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   calculating hybrid beamforming parameters for communications with a second device based at least in part on an estimation of channel information associated with at least a portion of a communication link at the second device via a machine learning model, wherein inputs to the machine learning model comprise measured parameters based at least in part on measurements performed by the second device, by one or more other devices, or both;
   transmitting, to the second device, a message indicating the hybrid beamforming parameters, wherein the hybrid beamforming parameters comprise an input for a beam refinement process at the second device; and
   communicating with the second device using one or more beams based at least in part on the hybrid beamforming parameters and a result of the beam refinement process.

2. The method of claim 1, wherein transmitting the message indicating the hybrid beamforming parameters comprises:
   transmitting the message indicating values used to generate the one or more beams in a beamforming codebook for use by the second device based at least in part on the estimation by the machine learning model, wherein the inputs to the machine learning model comprise a first set of hybrid beamforming parameters.

3. The method of claim 2, wherein the values used to generate the one or more beams in the beamforming codebook comprise adjustments for scaling the beamforming codebook from a first carrier frequency to a second carrier frequency different than the first carrier frequency.

4. The method of claim 2, further comprising:
   establishing communications with a third device using the first set of hybrid beamforming parameters; and
   utilizing the first set of hybrid beamforming parameters, position information associated with the third device, position information associated with the second device, or any combination thereof in the machine learning model based at least in part on establishing the communications with the third device.

5. The method of claim 4, wherein the position information associated with the third device and the position information associated with the second device indicate that the third device is within a threshold distance of the second device.

6. The method of claim 1, wherein transmitting the message indicating the hybrid beamforming parameters comprises:
   transmitting the message indicating an estimated angular spread associated with a cluster capturing a channel matrix for the communication link between the first device and the second device based at least in part on the estimation by the machine learning model, wherein the inputs to the machine learning model comprise a plurality of signal strength measurements.

7. The method of claim 6, further comprising:
   transmitting a plurality of reference signals to the second device, each reference signal of the plurality of reference signals transmitted using a respective beam of a plurality of beams, wherein the plurality of beams are steered toward spatially adjacent directions; and receiving, from the second device, the plurality of signal strength measurements, each signal strength measurement of the plurality of signal strength measurements associated with a respective reference signal of the plurality of reference signals.

8. The method of claim 7, wherein calculating the hybrid beamforming parameters comprises:
calculating the estimated angular spread associated with the cluster capturing the channel matrix based at least in part on a quantity of one or more signal strength measurements of the plurality of signal strength measurements that exceed a threshold signal strength.

9. The method of claim 1, wherein transmitting the message indicating the hybrid beamforming parameters comprises:
transmitting the message indicating a set of one or more initial hybrid beamforming weights associated with the one or more beams based at least in part on the estimation by the machine learning model, wherein the inputs to the machine learning model comprise a value indicative of a hand grip state associated with the second device.

10. The method of claim 9, further comprising:
receiving, from the second device, an indication of the hand grip state associated with a state of a hand or fingers that hold the second device relative to one or more antenna elements of the second device, wherein calculating the hybrid beamforming parameters is based at least in part on receiving the indication of the hand grip state.

11. The method of claim 10, wherein the indication of the hand grip state comprises an index of the hand grip state from a plurality of configured hand grip states.

12. The method of claim 9, wherein the hand grip state corresponds to one or more hand grip parameters, the one or more hand grip parameters comprising a reflective property of a hand, a grip arrangement of the hand, a quantity of fingers of the hand that occlude one or more antenna elements of the second device, an application executed by the second device, or any combination thereof.

13. The method of claim 1, wherein calculating the hybrid beamforming parameters comprises:
calculating the hybrid beamforming parameters based at least in part on a machine learning algorithm, a prediction algorithm, or both associated with the machine learning model.

14. The method of claim 1, wherein each of the first device and the second device is one of a base station, a user equipment (UE), an integrated access and backhaul node, an intelligent reflecting surface node, a relay node, a repeater, or a customer-premises equipment.

15. A method for wireless communication at a second device, comprising:
receiving, from a first device, a message indicating hybrid beamforming parameters for communications with the second device, wherein the hybrid beamforming parameters comprise an input for a beam refinement process at the second device;
performing the beam refinement process based at least in part on the hybrid beamforming parameters, wherein a result of the beam refinement process indicates one or more beams from a plurality of beams for the second device; and
communicating with the first device using the one or more beams based at least in part on the beam refinement process.

16. The method of claim 15, wherein receiving the message indicating the hybrid beamforming parameters comprises:
receiving the message indicating values used to generate the one or more beams in a beamforming codebook for use by the second device.

17. The method of claim 16, wherein the values used to generate the one or more beams in the beamforming codebook comprise adjustments for scaling the beamforming codebook from a first carrier frequency to a second carrier frequency different than the first carrier frequency.

18. The method of claim 15, wherein receiving the message indicating the hybrid beamforming parameters comprises:
receiving the message indicating an estimated angular spread associated with a cluster capturing a channel matrix for a communication link between the first device and the second device.

19. The method of claim 18, further comprising:
receiving a plurality of reference signals from the first device, each reference signal of the plurality of reference signals received using a respective beam of a plurality of beams, wherein the plurality of beams are steered toward spatially adjacent directions; and
transmitting, to the first device, a plurality of signal strength measurements, each signal strength measurement of the plurality of signal strength measurements associated with a respective reference signal of the plurality of reference signals, wherein the estimated angular spread is based at least in part on the plurality of signal strength measurements.

20. The method of claim 15, wherein receiving the message indicating the hybrid beamforming parameters comprises:
receiving the message indicating a set of one or more initial hybrid beamforming weights associated with the one or more beams.

21. The method of claim 20, further comprising:
transmitting, to the first device, an indication of a hand grip state associated with a state of a hand or fingers that hold the second device relative to one or more antenna elements of the second device, wherein the set of one or more initial hybrid beamforming weights is based at least in part on the indication of the hand grip state.

22. The method of claim 21, wherein the indication of the hand grip state comprises an index of the hand grip state from a plurality of configured hand grip states.

23. The method of claim 21, wherein the hand grip state corresponds to one or more hand grip parameters, the one or more hand grip parameters comprising a reflective property of a hand, a grip arrangement of the hand, a quantity of fingers of the hand that occlude one or more antenna elements of the second device, an application executed by the second device, or any combination thereof.

24. The method of claim 15, wherein each of the first device and the second device is one of a base station, a user equipment (UE), an integrated access and backhaul node, an intelligent reflecting surface node, a relay node, a repeater, or a customer-premises equipment.

25. An apparatus for wireless communication at a first device, comprising:
a processor;
memory coupled with the processor; and
instructions stored in the memory and executable by the processor to cause the apparatus to:

calculate hybrid beamforming parameters for communications with a second device based at least in part on an estimation of channel information associated with at least a portion of a communication link at the second device via a machine learning model, wherein inputs to the machine learning model comprise measured parameters based at least in part on measurements performed by the second device, by one or more other devices, or both;

transmit, to the second device, a message indicating the hybrid beamforming parameters, wherein the hybrid beamforming parameters comprise an input for a beam refinement process at the second device; and communicate with the second device using one or more beams based at least in part on the hybrid beamforming parameters and a result of the beam refinement process.

26. The apparatus of claim 25, wherein the instructions to transmit the message indicating the hybrid beamforming parameters are executable by the processor to cause the apparatus to:

transmit the message indicating values used to generate the one or more beams in a beamforming codebook for use by the second device based at least in part on the estimation by the machine learning model, wherein the inputs to the machine learning model comprise a first set of hybrid beamforming parameters.

27. The apparatus of claim 25, wherein the instructions to transmit the message indicating the hybrid beamforming parameters are executable by the processor to cause the apparatus to:

transmit the message indicating an estimated angular spread associated with a cluster capturing a channel matrix for the communication link between the first device and the second device based at least in part on the estimation by the machine learning model, wherein the inputs to the machine learning model comprise a plurality of signal strength measurements.

28. An apparatus for wireless communication at a second device, comprising:

a processor;

memory coupled with the processor; and instructions stored in the memory and executable by the processor to cause the apparatus to:

receive, from a first device, a message indicating hybrid beamforming parameters for communications with the second device, wherein the hybrid beamforming parameters comprise an input for a beam refinement process at the second device;

perform the beam refinement process based at least in part on the hybrid beamforming parameters, wherein a result of the beam refinement process indicates one or more beams from a plurality of beams for the second device; and communicate with the first device using the one or more beams based at least in part on the beam refinement process.

29. The apparatus of claim 28, wherein the instructions to receive the message indicating the hybrid beamforming parameters are executable by the processor to cause the apparatus to:

receive the message indicating values used to generate the one or more beams in a beamforming codebook for use by the second device.

30. The apparatus of claim 28, wherein the instructions to receive the message indicating the hybrid beamforming parameters are executable by the processor to cause the apparatus to:

receive the message indicating an estimated angular spread associated with a cluster capturing a channel matrix for a communication link between the first device and the second device.

* * * * *